(12) United States Patent
Tanaka et al.

(10) Patent No.: US 11,773,281 B2
(45) Date of Patent: Oct. 3, 2023

(54) INK SET AND INK JET METHOD

(71) Applicant: Seiko Epson Corporation, Tokyo (JP)

(72) Inventors: Kyohei Tanaka, Matsumoto (JP);
Keitaro Nakano, Matsumoto (JP);
Midori Sekine, Matsumoto (JP); Yuko Hishida, Matsumoto (JP)

(73) Assignee: SEIKO EPSON CORPORATION

( * ) Notice: Subject to any disclaimer, the term of this patent is extended or adjusted under 35 U.S.C. 154(b) by 320 days.

(21) Appl. No.: 17/012,171

(22) Filed: Sep. 4, 2020

(65) Prior Publication Data

US 2021/0071024 A1 Mar. 11, 2021

(30) Foreign Application Priority Data

Sep. 5, 2019 (JP) .............................. JP2019-161849

(51) Int. Cl.
| | | |
|---|---|---|
| *C09D 11/00* | (2014.01) | |
| *C09D 11/40* | (2014.01) | |
| *C09D 11/104* | (2014.01) | |
| *C09D 11/101* | (2014.01) | |
| *C09D 1/00* | (2006.01) | |
| *C09D 4/00* | (2006.01) | |
| *C09D 5/00* | (2006.01) | |
| *B41J 2/21* | (2006.01) | |

(52) U.S. Cl.
CPC .......... *C09D 11/40* (2013.01); *C09D 11/101* (2013.01); *C09D 11/104* (2013.01); *B41J 2/2114* (2013.01)

(58) Field of Classification Search
CPC ........ C09K 3/1409; C09K 3/1436; B01J 2/26; C01F 7/441; C04B 35/03; C04B 35/1115; C04B 35/505; C04B 2235/3213; C04B 2235/602; C04B 2235/94
USPC ................................. 106/31.01, 31.13, 31.6
See application file for complete search history.

(56) References Cited

U.S. PATENT DOCUMENTS

| | | |
|---|---|---|
| 9,751,337 B2 | 9/2017 | Steert |
| 10,550,275 B2 | 2/2020 | Hirose et al. |
| 10,683,427 B2 | 6/2020 | Umebayashi |
| 2004/0032473 A1 | 2/2004 | Ishimoto et al. |
| 2008/0125511 A1 | 5/2008 | Nakano et al. |
| 2008/0146689 A1 | 6/2008 | Oyanagi et al. |
| 2011/0234680 A1 | 9/2011 | Aoyama et al. |
| 2013/0065027 A1 | 3/2013 | Mochizuki et al. |

(Continued)

FOREIGN PATENT DOCUMENTS

| | | |
|---|---|---|
| EP | 2636709 A1 | 9/2013 |
| EP | 2942204 A1 | 11/2015 |

(Continued)

*Primary Examiner* — James E McDonough
(74) *Attorney, Agent, or Firm* — Harness, Dickey & Pierce, P.L.C.

(57) ABSTRACT

An ink set of radiation curable ink jet inks each of which contains polymerizable compounds, includes a color ink and a clear ink, the polymerizable compounds contained in the clear ink include a monomer A having a hydroxy group and a monomer B having a volume of 0.26 nm$^3$ or more and a height direction area of 0.25 nm$^2$ or more with respect to a long side each of which is defined by the Van der Waals radii, and a total content of the monomer A and the monomer B is 80 percent by mass or more with respect to a total mass of the polymerizable compounds contained in the clear ink.

8 Claims, 1 Drawing Sheet

(56) References Cited

U.S. PATENT DOCUMENTS

| | | |
|---|---|---|
| 2013/0230701 A1 | 9/2013 | Mochizuki |
| 2013/0258015 A1 | 10/2013 | Mizutaki et al. |
| 2015/0353751 A1 | 12/2015 | Umebayashi |
| 2017/0043593 A1 | 2/2017 | Steert |
| 2017/0114234 A1 | 4/2017 | Konda |
| 2017/0158890 A1 | 6/2017 | Hirose et al. |
| 2018/0282559 A1 | 10/2018 | Umebayashi |
| 2020/0199386 A1* | 6/2020 | Yoda ............... C09D 11/40 |

FOREIGN PATENT DOCUMENTS

| | | |
|---|---|---|
| EP | 3124561 A1 | 2/2017 |
| EP | 3170873 A1 | 5/2017 |
| EP | 3392051 A1 | 10/2018 |
| JP | 2007-314734 A | 12/2007 |
| JP | 2011-195724 A | 10/2011 |
| JP | 2013-067770 A | 4/2013 |
| JP | 2013-203873 A | 10/2013 |
| JP | 2016-020457 A | 2/2016 |
| WO | 2017-104845 A1 | 6/2017 |

* cited by examiner

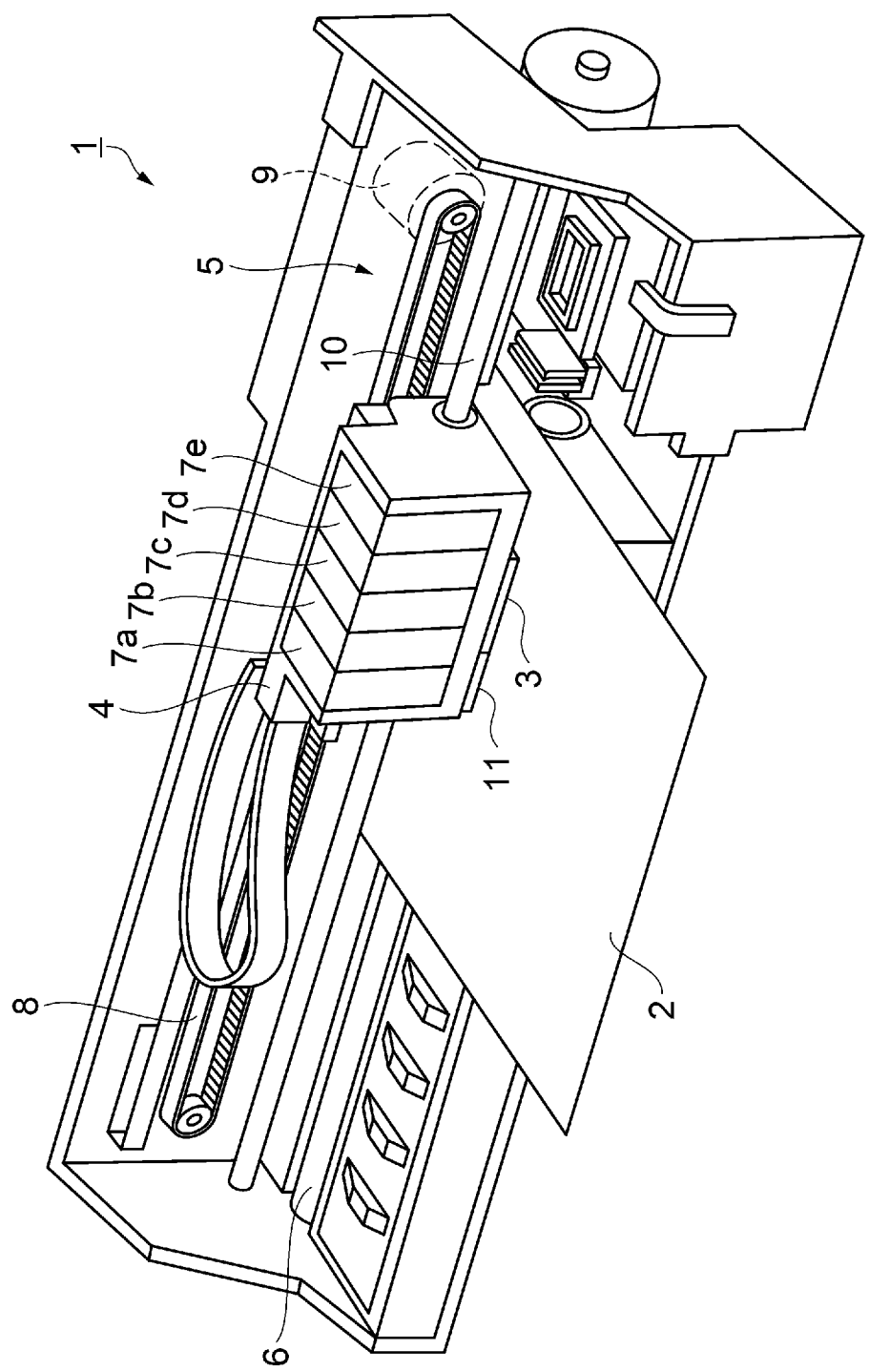

INK SET AND INK JET METHOD

The present application is based on, and claims priority from JP Application Serial Number 2019-161849, filed Sep. 5, 2019, the disclosure of which is hereby incorporated by reference herein in its entirety.

BACKGROUND

1. Technical Field

The present disclosure relates to an ink set and an ink jet method.

2. Related Art

Heretofore, an ink set including a color ink and a clear ink each of which is a radiation curable ink jet ink, has been known. For the ink set as described above, a polymerizable compound to be cured by radiation rays, such as ultraviolet rays, has been used. For example, in JP-A-2013-67770 has disclosed an ink set including a clear ink which uses as a polymerizable compound, phenoxyethyl acrylate (PEA) or isobornyl acrylate (IBXA).

However, the ink set disclosed in JP-A-2013-67770 has a problem in that gloss of a coating film formed by the clear ink is difficult to improve. In particular, when a coating film of a clear ink containing PEA or the like is formed on a coating film of a color ink, the gloss may be degraded in some cases. When the gloss is degraded, in the case in which the ink set is used for a printed matter, such as a signage, a sufficient appearance quality may not be obtained in some cases.

In addition, in the coating film formed by the clear ink, an odor is also disadvantageously liable to be increased in some cases. In particular, when a polymerizable compound, such as IBXA, having a relatively bulky molecular structure is used, although the degradation of the gloss described above is not likely to occur, a strong odor may be generated from the coating film thus formed in some cases. That is, an ink set in which in the clear ink, the gloss of the coating film is not only improved but also the odor is suppressed from being generated therefrom has been desired.

SUMMARY

According to an aspect of the present disclosure, there is provided an ink set of radiation curable ink jet inks each of which contains polymerizable compounds, and the ink set comprises a color ink and a clear ink. In the ink set described above, the polymerizable compounds contained in the clear ink include a monomer A having a hydroxy group and a monomer B having a volume of 0.26 $nm^3$ or more and a height direction area of 0.25 $nm^2$ or more with respect to a long side each of which is defined by the Van der Waals radii, and a total content of the monomer A and the monomer B is 80 percent by mass or more with respect to a total mass of the polymerizable compounds contained in the clear ink.

In the ink set described above, a content of the monomer A may be 5 to 15 percent by mass with respect to the total mass of the polymerizable compounds contained in the clear ink.

In the ink set described above, a content of the monomer B may be 70 percent by mass or more with respect to the total mass of the polymerizable compounds contained in the clear ink.

In the ink set described above, the polymerizable compounds contained in the clear ink may include a monofunctional monomer, and a content of the monofunctional monomer may be 85 percent by mass or more with respect to the total mass of the polymerizable compounds contained in the clear ink.

In the ink set described above, the polymerizable compounds contained in the clear ink may include a multifunctional monomer, and a content of the multifunctional monomer may be 0.01 to 15.00 percent by mass with respect to a total mass of the clear ink.

In the ink set described above, a mass ratio of the contents of the polymerizable compounds contained in the clear ink is regarded as a weight basis, and a weighted average of glass transition temperatures of homopolymers of the respective polymerizable compounds may be 48° C. or more.

In the ink set described above, the polymerizable compounds contained in the color ink may include a monofunctional monomer, and a content of the monofunctional monomer may be 85 percent by mass or more with respect to a total mass of the polymerizable compounds contained in the color ink.

According to another aspect of the present disclosure, there is provided an ink jet method using the ink set described above, and the ink jet method comprises: a first ejection step of ejecting the color ink from an ink jet head to be adhered to a recording medium; a first curing step of emitting radiation rays on the color ink adhered to the recording medium; a second ejection step of ejecting the clear ink from an ink jet head to be adhered to a region of the recording medium including the color ink irradiated with the radiation rays; and a second curing step of emitting radiation rays on the clear ink adhered to the recording medium.

The ink jet method described above may further comprise, between the second ejection step and the second curing step, a leveling step of allowing the recording medium to which the clear ink is adhered to stand still.

BRIEF DESCRIPTION OF THE DRAWINGS

FIGURE is a schematic perspective view showing the structure of an ink jet printer according to an embodiment.

DESCRIPTION OF EXEMPLARY EMBODIMENTS

1. Ink Set

An ink set according to this embodiment includes a color ink and a clear ink each of which is a radiation curable ink jet ink containing polymerizable compounds. The ink set described above may contain at least two types of color inks containing different colorants. An ink jet method according to this embodiment is provided for application in which by the use of the ink set described above, an image, a color, a letter, a pattern, and/or the like is formed on a recording medium by an ink jet method. Since at least two color inks having different color tones are contained in the ink set, for example, in an image to be formed, a desired color tone is likely to be obtained. In addition, the application of the ink set according to this embodiment is not limited to the above application and, for example, may be applied to 3D model formation.

In this embodiment, the radiation curable ink jet ink indicates an ink jet ink to be cured by irradiation with radiation rays. As the radiation rays, for example, there may be mentioned ultraviolet rays, electron rays, infrared rays, visible rays, or X-rays. Among those rays mentioned above, since the radiation ray sources have been easily available and also widely used, and materials to be appropriately cured by the peak wavelength of the radiation rays have been easily available and also widely used, as the radiation rays, ultraviolet rays are preferably used.

1.1. Clear Ink

The clear ink according to this embodiment includes a photopolymerization initiator and, as the polymerizable compounds, a monomer A and a monomer B each of which will be described later. In the clear ink, at least one polymerizable compound other than the monomer A and the monomer B may also be included. The clear ink is not an ink to be used for coloration of a recording medium and is an ink to be used, for example, for protection of a coating film formed from the color ink and/or for adjustment of the degree of gloss of a printed matter. Hence, the content of a colorant to be contained in the clear ink is preferably 0.2 percent by mass or less with respect to the total mass thereof, and the clear ink more preferably contains no colorant. Hereinafter, components contained in the clear ink of this embodiment will be described. In the following description, a coating film formed from the clear ink is also called a coating film of the clear ink, and a coating film formed from the color ink is also called a coating film of the color ink.

When a coating film of a related clear ink is formed on a coating film of a color ink containing phenoxyethyl acrylate (PEA) or the like, the gloss of the coating film may not be secured in some cases. Accordingly, through a research carried out by the present inventors, it was found that by using a monomer B having a bulky molecular structure for the clear ink, the gloss of the coating film of the clear ink is improved. In the case described above, the monomer B having a bulky molecular structure indicates a polymerizable compound having a volume of 0.26 nm$^3$ or more and a height direction area of 0.25 nm$^2$ or more with respect to a long side each of which is defined by the Van der Waals radii.

In addition, when a polymerizable compound having a relatively bulky molecular structure is used, in the coating film of the related clear ink, an odor may be increased in some cases. Accordingly, by a further research carried out by the present inventors, it was found that when the monomer A having a hydroxy group is also used together therewith, an odor generated from the coating film of the clear ink can be suppressed.

In the clear ink of this embodiment, the total content of the monomer A and the monomer B with respect to the total mass of the polymerizable compounds contained in the clear ink is 80 percent by mass or more, preferably 82 percent by mass or more, and more preferably 84 percent by mass or more. Accordingly, when a polymerizable compound, such as PEA, other than the monomer A and monomer B is contained in the clear ink, the content of the polymerizable compound other than the monomer A and the monomer B is inevitably decreased, and the gloss of the coating film is improved. Although not particularly limited, the upper limit of the total content of the monomer A and the monomer B contained in the clear ink is preferably 99 percent by mass or less, more preferably 97 percent by mass or less, and further preferably 95 percent by mass or less. Accordingly, a curing property of the clear ink can be improved.

In this embodiment, in the polymerizable compounds to be used for the clear ink, a polymerizable compound corresponding to both the monomer A and the monomer B may also be included. In this case, for the calculation of the total content of the monomer A and the monomer B, the content of the monomer corresponding to both the monomer A and the monomer B is not calculated twice for the monomer A and the monomer B. That is, the total content of the monomer A and the monomer B indicates the total content of a monomer A not corresponding to the monomer B, a monomer B not corresponding to the monomer A, and a monomer corresponding to both the monomer A and the monomer B. The monomer A and the monomer B will be described later in detail. Hereinafter, components contained in the clear ink of this embodiment will be described.

1.1.1. Polymerizable Compound

In the polymerizable compounds, a monofunctional monomer having one polymerizable functional group, a multifunctional monomer having a plurality of polymerizable functional groups, and an oligomer having at least one polymerizable functional group are included. Those polymerizable compounds may be used alone, or at least two types thereof may be used in combination.

The polymerizable functional group of the polymerizable compound of this embodiment is not particularly limited as long as capable of performing a polymerization reaction by radiation rays, and known polymerizable functional groups may be used. In particular, as the polymerizable functional group, in view of a polymerization reactivity, a polymerizable functional group having an unsaturated double bond between carbons is preferable, a methacryloyl group is more preferable, and an acryloyl group is even more preferable.

In addition, in this specification, a (meth)acryloyl indicates at least one of an acryloyl and a methacryloyl corresponding thereto, a (meth)acrylate indicates at least one of an acrylate and a methacrylate corresponding thereto, and a (meth)acryl indicates at least one of an acryl and a methacryl corresponding thereto.

When a mass ratio of the contents of the polymerizable compounds contained in the clear ink is regarded as a weight basis, the weighted average of glass transition temperatures of homopolymers of the respective polymerizable compounds is 48° C. or more. The weighted average of the glass transition temperatures is preferably 70° C. or more and more preferably 85° C. or more. Since the weighted average of the glass transition temperatures is 48° C. or more, abrasion resistance of the coating film of the clear ink in a room temperature environment at approximately 25° C. can be improved. Although not particularly limited, the upper limit of the weighted average of the glass transition temperatures is preferably 140° C. or less, more preferably 120° C. or less, and further preferably 110° C. or less.

A method for calculating the weighted average of the glass transition temperatures will be described. The weighted average value of the glass transition temperatures is represented by $Tg_{all}$ (° C.), a glass transition temperature of a homopolymer of the corresponding polymerizable compound is represented by $Tg_N$ (° C.), and a mass ratio of the content of the polymerizable compound corresponding to the homopolymer, that is, a content ratio of the polymerizable compound with respect to the total mass of the polymerizable compounds, is represented by $X_N$ (percent by mass). N indicates an ordinal number sequentially starting from 1 in accordance with the types of polymerizable compounds contained in the clear ink. In particular, when three types of polymerizable compounds are used, $Tg_1$, $Tg_2$, and $Tg_3$ are set.

The weighted average $Tg_{all}$ of the glass transition temperatures is the total of the products each obtained from the glass transition temperature $Tg_N$ of the homopolymer corresponding to the polymerizable compound and the content rate $X_N$ of the polymerizable compound. Hence, the following equation (1) is satisfied.

$$Tg_{all} = \Sigma Tg_N \times X_N \qquad (1)$$

The weighted average $Tg_{all}$ of the glass transition temperatures described above can be adjusted by the glass transition temperatures of the polymerizable compounds to be used for the clear ink and the mass ratio of the polymerizable compounds described above. In addition, the glass transition temperature of the homopolymer of the polymerizable compound can be obtained from the safety data sheet (SDS) and catalogue information of a corresponding polymerizable compound.

1.1.1.1. Monomer A

The monomer A has a hydroxy group in its molecular structure. The number of hydroxy groups in the molecular structure of the monomer A is one or two or more. In order not to easily increase the viscosity of the clear ink, the number of hydroxy groups is preferably one.

Although a concrete example of the monomer A is not particularly limited, as a monofunctional monomer having one hydroxy group, for example, 4-hydroxybutyl (meth) acrylate or hydroxypropyl (meth)acrylate may be mentioned. In addition, as the monomer A, a commercially available product, such as 2-hydroxy-3-phenoxypropyl acrylate, may also be used. In addition, 2-hydroxy-3-phenoxypropyl acrylate is a monomer corresponding to both the monomer A and the monomer B.

The content of the monomer A contained in the clear ink with respect to the total mass of the polymerizable compounds contained in the clear ink is 5 to 15 percent by mass, preferably 7 to 13 percent by mass, and more preferably 10 to 12 percent by mass. Accordingly, an odor generated from the coating film of the clear ink can be further suppressed, and in addition, an excessive increase in viscosity of the clear ink can also be suppressed. In addition, the content of the monomer A contained in the clear ink is assumed to include the content of a monomer corresponding to both the monomer A and the monomer B.

1.1.1.2. Monomer B

The molecular structure of the monomer B described below has bulky characteristics. The volume of the monomer B defined by the Van der Waals radii is 0.26 nm$^3$ or more, preferably 0.27 nm$^3$ or more, and more preferably 0.28 nm$^3$ or more. In addition, although not particularly limited, the upper limit of the volume of the monomer B defined by the Van der Waals radii is preferably 0.60 nm$^3$ or less, more preferably 0.55 nm$^3$ or less, and further preferably 0.50 nm$^3$ or less.

The height direction area of the monomer B with respect to the long side defined by the Van der Waals radii is 0.25 nm$^2$ or more, preferably 0.27 nm$^2$ or more, and more preferably 0.29 nm$^2$ or more. Although not particularly limited, the upper limit of the height direction area of the monomer B with respect to the long side defined by the Van der Waals radii is preferably 0.50 nm$^2$ or less, more preferably 0.45 nm$^2$ or less, and further preferably 0.40 nm$^2$ or less. Since the molecular structure of the monomer B has the bulky characteristics described above, the gloss of the coating film of the clear ink can be improved.

In this embodiment, the volume and the height direction area with respect to the long side defined by the Van der Waals radii are obtained as the volume and the height direction area with respect to the long side, respectively, in a molecular structure having the lowest energy among structural isomers of the molecule. For the identification of a three-dimensional shape defined by the Van der Waals radii and the calculation of the volume and the height direction area with respect to the long side based on the above identification, for example, known software, such as thermodynamic property simulation software, may be used.

The volume defined by the Van der Waals radii indicates, as for a molecule floating in vacuum approximated from the chemical formula, the volume of a three-dimensional shape of the molecule formed by the Van der Waals radii of atoms forming the molecule, that is, the volume of the cavity. In addition, the long side defined by the Van der Waals radii is the longest side of the three-dimensional shape described above. The long side is obtained by calculation such that after the structure in which the molecule is most stabilized is modeled, among skeleton-forming terminal atoms, such as carbon, oxygen, and nitrogen, the terminal atoms having the longest distance therebetween are selected. Furthermore, the height direction area with respect to the long side is a value obtained by dividing the volume described above by the long side and is an index of the area of a plane orthogonal to the long side.

The monomer B may be either a monofunctional monomer or a multifunctional monomer. In addition, as described above, the monomer B may also have, as its feature, a hydroxy group in its molecular structure which is required for the monomer A.

Although the monomer B is not particularly limited, for example, there may be mentioned a monofunctional monomer, such as dicyclopentenyl acrylate (DCPA), isobornyl acrylate (IBXA), isobornyl methacrylate, 3,3,5-trimethylcyclohexyl acrylate (TMCHA), tert-butylcylcohexanol acrylate (TBCHA), isononyl acrylate (INAA), or lauryl acrylate (LA); a multifunctional monomer, such as dipropylene glycol diacrylate (DPGDA); or a monomer, such as 2-hydroxy-3-phenoxypropyl acrylate, having features of the monomer A and the monomer B.

The content of the monomer B contained in the clear ink with respect to the total mass of the polymerizable compounds contained in the clear ink is preferably 70 percent by mass or more, preferably 73 percent by mass or more, and more preferably 78 percent by mass or more. Accordingly, the gloss of the coating film of the clear ink can be further improved. Although not particularly limited, the upper limit of the content of the monomer B with respect to the total mass of the polymerizable compounds contained in the clear ink is preferably 90 percent by mass or less, more preferably 87 percent by mass or less, and further preferably 85 percent by mass or less. Accordingly, while the curing property of the clear ink is improved, the odor of the coating film of the cured clear ink can be suppressed.

1.1.1.3. Monofunctional Monomer

The polymerizable compounds contained in the clear ink include a monofunctional monomer. As the monofunctional monomer, at least one monomer corresponding to the monomer A and/or the monomer B and at least one other monofunctional monomer not corresponding thereto are included.

Although the monofunctional monomer is not particularly limited, for example, a nitrogen-containing monofunctional monomer, a monofunctional (meth)acrylate having a cross-linked condensed ring structure, an aromatic group-containing monofunctional monomer, or a saturated aliphatic group-containing monofunctional monomer may be mentioned. In addition, if needed, at least one other monofunctional monomer may be used instead of or besides those mentioned above. In addition, although the polymerizable functional group of the monofunctional monomer is not particularly limited, a known polymerizable functional group, in particular, a polymerizable functional group having an unsaturated double bond between carbons, may be used.

The content of the monofunctional monomer contained in the clear ink with respect to the total mass of the polymerizable compounds contained in the clear ink is 85 percent by mass or more, preferably 90 percent by mass or more, and more preferably 95 percent by mass or more. Accordingly, the coating film of the clear ink becomes flexible, and a stretching property thereof can be improved. Although not particularly limited, the upper limit of the content of the above monofunctional monomer with respect to the total mass of the polymerizable compounds contained in the clear ink is preferably 99 percent by mass or less, more preferably 98 percent by mass or less, and further preferably 97 percent by mass or less. Accordingly, the curing property of the clear ink and the abrasion resistance of the coating film thereof can be improved.

In addition, the content of the monofunctional monomer contained in the clear ink with respect to the total mass of the clear ink is preferably 70 percent by mass or more, more preferably 75 percent by mass or more, and further preferably 80 percent by mass or more. Accordingly, the stretching property of the coating film is further improved. In addition, the upper limit of the content of the above monofunctional monomer with respect to the total mass of the clear ink is preferably 95 percent by mass or less, more preferably 92 percent by mass or less, and further preferably 90 percent by mass or less. Accordingly, the curing property of the clear ink and the abrasion resistance of the coating film thereof are further improved.

Hereinafter, although concrete examples of the monofunctional monomer will be shown, the monofunctional monomer according to this embodiment is not limited to the following examples.

1.1.1.3.1. Nitrogen-Containing Monofunctional Monomer

Although the nitrogen-containing monofunctional monomer is not particularly limited, for example, there may be mentioned a nitrogen-containing monofunctional vinyl monomer, such as N-vinylcaprolactam, N-vinylformamide, N-vinylcarbazole, N-vinylacetamide, or N-vinylpyrrolidone; a nitrogen-containing monofunctional acrylate monomer, such as acryloylmorpholine; or a nitrogen-containing monofunctional acrylamide monomer, such as (meth)acrylamide, N-hydroxymethyl(meth)acrylamide, diacetone acrylamide, N,N-dimethyl(meth)acrylamide, or dimethylaminoethyl acrylate benzyl chloride quaternary salt.

Among those compounds mentioned above, the nitrogen-containing monofunctional vinyl monomer or the nitrogen-containing monofunctional acrylate monomer is preferable, a monomer, such as N-vinylcaprolactam, N-vinylcarbazole, N-vinylpyrrolidone, or acryloylmorpholine, having a nitrogen-containing heterocyclic structure is more preferable, and acryloylmorpholine is further preferably contained.

By using the nitrogen-containing monofunctional monomer as described above, the abrasion resistance of the coating film of the clear ink is improved. Furthermore, the nitrogen-containing monofunctional acrylate monomer, such as acryloylmorpholine, having a nitrogen-containing heterocyclic structure improves, in the coating film of the clear ink, the stretching property and the adhesion to the recording medium and the coating film of the color ink. In addition, in the following description, the adhesion to the recording medium and the coating film of the other ink may also be simply called the adhesion in some cases.

The content of the nitrogen-containing monofunctional monomer contained in the clear ink with respect to the total mass of the polymerizable compounds is preferably 2 to 15 percent by mass, more preferably 3 to 13 percent by mass, and further preferably 4 to 12 percent by mass. Accordingly, in the coating film of the clear ink, the abrasion resistance and the adhesion are improved.

The content of the nitrogen-containing monofunctional monomer contained in the clear ink with respect to the total mass of the clear ink is preferably 2 to 15 percent by mass, more preferably 3 to 12 percent by mass, and further preferably 4 to 11 percent by mass. Accordingly, in the coating film of the clear ink, the abrasion resistance and the adhesion are improved.

1.1.1.3.2. Monofunctional (Meth)Acrylate Having Cross-Linked Condensed Ring Structure The cross-linked condensed ring structure of the monofunctional (meth)acrylate having a cross-linked condensed ring structure indicates the structure in which at least two ring structures share one side between two ring structures, and in the same ring structure or between different ring structures, at least two atoms which are not adjacent to each other are linked together. As the monofunctional (meth)acrylate having a cross-linked condensed ring structure, for example, dicyclopentenyl (meth)acrylate, dicyclopentenyloxyethyl (meth)acrylate, or dicyclopentanyl (meth)acrylate may be mentioned. In addition, as other cross-linked condensed ring structures, the structures represented by the following general formulas (a) and (b) may also be mentioned.

[Chem. 1]

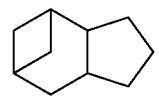

(a)

[Chem. 2]

(b)

Among those compounds mentioned above, dicyclopentenyl acrylate (DCPA) corresponding to the monomer B is more preferably contained. By the use of the monofunctional (meth)acrylate having a cross-linked condensed ring structure as described above, in the coating film of the clear ink, the abrasion resistance, the stretching property, and the adhesion are further improved. Furthermore, the gloss of the coating film of the clear ink is further improved.

The content of the monofunctional (meth)acrylate having a cross-linked condensed ring structure contained in the clear ink with respect to the total mass of the polymerizable compounds is preferably 10 to 65 percent by mass, more preferably 15 to 63 percent by mass, and further preferably 20 to 60 percent by mass. Accordingly, the abrasion resistance and the adhesion of the coating film of the clear ink are improved.

The content of the monofunctional (meth)acrylate having a cross-linked condensed ring structure contained in the clear ink with respect to the total mass of the clear ink is preferably 10 to 60 percent by mass, more preferably 15 to 57 percent by mass, and further preferably 20 to 55 percent by mass. Accordingly, the abrasion resistance and the adhesion of the coating film of the clear ink are improved.

1.1.1.3.3. Aromatic Group-Containing Monofunctional Monomer

Although the aromatic group-containing monofunctional monomer is not particularly limited, for example, there may be mentioned phenoxyethyl (meth)acrylate, benzyl (meth)acrylate, an alkoxylated 2-phenoxyethyl (meth)acrylate, ethoxylated nonylphenyl (meth)acrylate, an alkoxylated nonylphenyl (meth)acrylate, a p-cumylphenol EO-modified (meth)acrylate, or 2-hydroxy-3-phenoxypropyl (meth)acrylate.

Among those compounds mentioned above, phenoxyethyl (meth)acrylate or benzyl (meth)acrylate is preferable, phenoxyethyl (meth)acrylate is more preferable, and phenoxyethyl acrylate (PEA) is further preferable. When the aromatic group-containing monofunctional monomer as described above is used, the solubility of the photopolymerization initiator is further improved, and in addition, the curing property of the clear ink is improved. In particular, as the photopolymerization initiator which will be described later, when an acylphosphine oxide-based photopolymerization initiator or a thioxantone-based photopolymerization initiator is used, the aromatic group-containing monofunctional monomer mentioned above is preferable.

The content of the aromatic group-containing monofunctional monomer contained in the clear ink with respect to the total mass of the polymerizable compounds is preferably 2 to 15 percent by mass, more preferably 3 to 13 percent by mass, and further preferably 4 to 12 percent by mass. Accordingly, the adhesion and the abrasion resistance of the coating film of the clear ink are improved.

The content of the aromatic group-containing monofunctional monomer contained in the clear ink with respect to the total mass of the clear ink is preferably 2 to 15 percent by mass, more preferably 3 to 12 percent by mass, and further preferably 4 to 11 percent by mass. Accordingly, the adhesion and the abrasion resistance of the coating film of the clear ink are improved.

1.1.1.3.4. Saturated Aliphatic Group-Containing Monofunctional Monomer

Although the saturated aliphatic group-containing monofunctional monomer is not particularly limited, for example, there may be mentioned an alicyclic group-containing (meth)acrylate, such as isobornyl (meth)acrylate, tert-butyl cyclohexanol acrylate (TBCHA), or 2-(meth)acrylic acid-1,4-dioxaspiro[4,5]dec-2-ylmethyl; an aliphatic group-containing (meth)acrylate having a linear or a branched chain, such as isoamyl (meth)acrylate, stearyl (meth)acrylate, lauryl (meth)acrylate, octyl (meth)acrylate, decyl (meth)acrylate, isodecyl (meth)acrylate, isomyristyl (meth)acrylate, isostearyl (meth)acrylate, 2-hydroxybutyl (meth)acrylate, butoxyethyl (meth)acrylate, tetrahydrofurfuryl (meth)acrylate, 2-hydroxyethyl (meth)acrylate, or 2-hydroxypropyl (meth)acrylate: or a lactone-modified flexible (meth)acrylate. In addition, in this specification, the saturated aliphatic group-containing monofunctional monomer is assumed to be not a compound having a cross-linked condensed ring structure.

Among those compounds mentioned above, isobornyl (meth)acrylate or tert-butyl cyclohexanol acrylate (TBCHA), each of which corresponds to the monomer B, is preferable. By the use of the saturated aliphatic group-containing monofunctional monomer as described above, the curing property of the clear ink and the abrasion resistance of the coating film are improved, and in addition, the gloss of the coating film of the clear ink is improved.

The content of the saturated aliphatic group-containing monofunctional monomer contained in the clear ink with respect to the total mass of the polymerizable compounds is preferably 15 to 85 percent by mass, more preferably 20 to 80 percent by mass, and further preferably 25 to 75 percent by mass. Accordingly, the curing property of the clear ink and the abrasion resistance of the coating film are improved.

The content of the saturated aliphatic group-containing monofunctional monomer contained in the clear ink with respect to the total mass of the clear ink is preferably 15 to 80 percent by mass, more preferably 17 to 75 percent by mass, and further preferably 20 to 70 percent by mass. Accordingly, the curing property of the clear ink and the abrasion resistance of the coating film are improved.

1.1.1.3.5. Other Monofunctional Monomers

As monofunctional monomers other than the monofunctional monomers described above, for example, there may be mentioned unsaturated carboxylic acids, such as (meth)acrylic acid, itaconic acid, crotonic acid, isocrotonic acid, and maleic acid; salts of the unsaturated carboxylic acids mentioned above, unsaturated carboxylate esters, urethanes, amides and anhydrides thereof, acrylonitrile, styrene, various unsaturated polyesters, unsaturated polyethers, unsaturated polyamides, and unsaturated urethanes.

1.1.1.4. Multifunctional Monomer

The polymerizable compounds contained in the clear ink may also include a multifunctional monomer. As the multifunctional monomer, for example, a vinyl ether group-containing (meth)acrylate or a multifunctional (meth)acrylate may be mentioned. In addition, as the multifunctional monomer, a monomer, such as dipropylene glycol diacrylate (DPGDA), corresponding to the monomer B may also be used.

The content of the multifunctional monomer contained in the clear ink with respect to the total mass of the polymerizable compounds is preferably 0.01 to 20.00 percent by mass, more preferably 0.01 to 15.00 percent by mass, and further preferably 1.00 to 15.00 percent by mass. Since the content of the multifunctional monomer is 0.01 percent by mass or more, the curing property of the clear ink and the abrasion resistance of the coating film are improved. In addition, since the content of the multifunctional monomer is 20.00 percent by mass or less, the stretching property and the adhesion of the coating film of the clear ink are improved.

The content of the multifunctional monomer contained in the clear ink with respect to the total mass of the clear ink is preferably 0.01 to 15.00 percent by mass, more preferably 0.50 to 15.00 percent by mass, and further preferably 1.00 to 15.00 percent by mass. Since the content of the multifunctional monomer is 0.01 percent by mass or more, the curing property of the clear ink and the abrasion resistance of the coating film thereof are improved. In addition, since the content of the multifunctional monomer is 15.00 percent by mass or less, the stretching property and the adhesion of the coating film tend to be improved.

Hereinafter, although concrete examples of the multifunctional monomer are shown, the multifunctional monomer according to this embodiment is not limited to those mentioned below.

1.1.1.4.1. Vinyl Ether Group-Containing (Meth)Acrylate

Although the vinyl ether group-containing (meth)acrylate is not particularly limited, for example, a compound represented by the following general formula (c) may be mentioned. Since the vinyl ether group-containing (meth)acrylate as described above is contained, the viscosity of the clear ink is decreased, and hence, ejection stability is improved. In addition, the curing property of the clear ink is improved, and in addition, in association with the improvement in curing property, a recording rate on the recording medium can be increased.

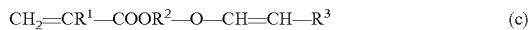
$$CH_2=CR^1-COOR^2-O-CH=CH-R^3 \quad (c)$$

In the above formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

In the above formula (c), as the divalent organic residue having 2 to 20 carbon atoms represented by $R^2$, for example, there may be mentioned a linear, a branched, or a cyclic substituted or unsubstituted alkylene group having 2 to 20 carbon atoms, a substituted or unsubstituted alkylene group having 2 to 20 carbon atoms and an oxygen atom of an ether bond and/or an ester bond in the structure, or a substituted or unsubstituted divalent aromatic group having 6 to 11 carbon atoms.

Among those mentioned above, an alkylene group, such as an ethylene group, an n-propylene group, an isopropylene group, or a butylene group, having 2 to 6 carbon atoms or an alkylene group, such as an oxyethylene group, an oxy-n-propylene group, an oxyisopropylene group, or an oxybutylene group, having 2 to 9 carbon atoms and an oxygen atom of an ether bond in its structure is preferable. Furthermore, in view of the decrease in viscosity of the clear ink and the improvement in curing property of the clear ink, $R^2$ is more preferably an alkylene group, such as an oxyethylene group, an oxy-n-propylene group, an oxyisopropylene group, or an oxybutylene group, having 2 to 9 carbon atoms and an oxygen atom of an ether bond in its structure and also having a glycol ether chain.

In the general formula (c), as the monovalent organic residue having 1 to 11 carbon atoms represented by $R^3$, a linear, a branched, or a cyclic substituted or unsubstituted alkyl group having 1 to 10 carbon atoms or an a substituted or unsubstituted aromatic group having 6 to 11 carbon atoms is preferable. Among those mentioned above, an alkyl group, such as a methyl group or an ethyl group, having 1 to 2 carbon atoms or an aromatic group, such as a phenyl group or a benzyl group, having 6 to 8 carbon atoms is preferably used.

When the above organic residues may be substituted groups, the substituents thereof are classified into a group having at least one carbon atom and a group having no carbon atom. First, when the substituent described above is a group having at least one carbon atom, the carbon atom thereof is counted as the number of carbons of the organic residue. As the group having at least one carbon atom, for example, there may be mentioned, but not limited to, a carboxy group or an alkoxy group. As the group having no carbon atom, for example, there may be mentioned, but not limited to, a hydroxy group or a halogen group.

Although concrete examples of the compound represented by the general formula (c) are not particularly limited, for example, there may be mentioned 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl (meth)acrylate, 2-(vinyloxyisopropoxy)ethyl (meth)acrylate, 2-(vinyloxyethoxy) propyl (meth)acrylate, 2-(vinyloxyethoxy) isopropyl (meth)acrylate, 2-(vinyloxyisopropoxy) propyl (meth)acrylate, 2-(vinyloxyisopropoxy) isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy) propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy) isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth) acrylate, a polyethylene glycol monovinyl ether (meth) acrylate, or a polypropylene glycol monovinyl ether (meth) acrylate. Among those concrete examples, since the balance between the curing property and the viscosity of the clear ink are easily obtained, 2-(2-vinyloxyethoxy)ethyl acrylate is particularly preferable.

The content of the vinyl ether group-containing (meth) acrylate contained in the clear ink with respect to the total mass of the polymerizable compounds is preferably 1 to 10 percent by mass, more preferably 2 to 8 percent by mass, and further preferably 2 to 6 percent by mass. Accordingly, the viscosity of the clear ink is decreased, and hence, the ejection stability of the clear ink from an ink jet head is improved.

The content of the vinyl ether group-containing (meth) acrylate contained in the clear ink with respect to the total mass of the clear ink is preferably 1 to 10 percent by mass, more preferably 1 to 8 percent by mass, and further preferably 2 to 6 percent by mass. Accordingly, the viscosity of the clear ink is decreased, and hence, the ejection stability thereof from an ink jet head is improved.

1.1.1.4.2. Multifunctional (Meth)Acrylate

Although the multifunctional (meth)acrylate is not particularly limited, for example, there may be mentioned a difunctional (meth)acrylate, such as dipropylene glycol diacrylate (DPGDA) mentioned above, diethylene glycol di(meth)acrylate, triethylene glycol di(meth)acrylate, tetraethylene glycol di(meth)acrylate, a polyethylene glycol di(meth)acrylate, dipropylene glycol dimethacrylate, tripropylene glycol di(meth)acrylate, a polypropylene glycol di(meth)acrylate, 1,4-butanediol di(meth)acrylate, 1,6-hexanediol di(meth)acrylate, 1,9-nonanediol di(meth)acrylate1, neopentyl glycol di(meth)acrylate, dimethylol tricyclodecane di(meth)acrylate, an EO (ethylene oxide) adduct of bisphenol A di(meth)acrylate, a PO (propylene oxide) adduct of bisphenol A di(meth)acrylate, neopentyl glycol hydroxypivalate di(meth)acrylate, or a polytetramethylene glycol di(meth)acrylate; or a multifunctional (meth)acrylate having at least three functional groups, such as trimethylolpropane tri(meth)acrylate, an EO-modified trimethylolpropane tri(meth)acrylate, pentaerythritol tri(meth)acrylate, pentaerythritol tetra(meth)acrylate, dipentaerythritol hexa (meth)acrylate, ditrimethylolpropane tetra(meth)acrylate, glycerin propoxy tri(meth)acrylate, caprolactone-modified trimethylolpropane tri(meth)acrylate, pentaerythritol ethoxy tetra(meth)acrylate, or caprolactam-modified dipentaerythritol hexa(meth)acrylate.

The content of the multifunctional (meth)acrylate contained in the clear ink with respect to the total mass of the polymerizable compounds is preferably 1 to 20 percent by mass, more preferably 1 to 17 percent by mass, and further preferably 2 to 15 percent by mass. Since the content of the multifunctional (meth)acrylate is 1 percent by mass or more, the abrasion resistance of the coating film of the clear ink is improved. Since the content of the multifunctional (meth) acrylate is 20 percent by mass or less, the stretching property and the adhesion of the coating film of the clear ink are improved.

The content of the multifunctional (meth)acrylate contained in the clear ink with respect to the total mass of the clear ink is preferably 1 to 20 percent by mass, more preferably 1 to 17 percent by mass, and further preferably 2 to 15 percent by mass. Since the content of the multifunctional (meth)acrylate with respect to the total mass of the clear ink is 1 percent by mass or more, the abrasion resistance of the coating film of the clear ink is improved. Since the content of the multifunctional (meth)acrylate is 20 percent by mass or less with respect to the total mass of the clear ink, the stretching property and the adhesion of the coating film of the clear ink are improved.

1.1.2. Photopolymerization Initiator

The photopolymerization initiator has a function to generate active species by irradiation with radiation rays and to advance a polymerization reaction of the polymerizable compounds by the active species. The active species generated from the photopolymerization initiator is in particular, a radical, an acid, a base, and/or the like. Although the photopolymerization initiator is not particularly limited as long as having the function described above, for example, a known photopolymerization initiator, such as an acylphosphine oxide-based photopolymerization initiator, an alkylphenone-based photopolymerization initiator, a titanocene-based photopolymerization initiator, or a thioxanthone-based photopolymerization initiator may be mentioned. Among those compound mentioned above, the acylphosphine oxide-based photopolymerization initiator is preferable. By the use of the photopolymerization initiator mentioned above, the curing property of the clear ink, in particular, the curing property thereof in a curing process by light emitted from an ultraviolet light-emitting diode (UV-LED), is improved. The photopolymerization initiators may be used alone, or at least two types thereof may be used in combination.

Although the acylphosphine oxide-based photopolymerization initiator is not particularly limited, for example, there may be mentioned 2,4,6-trimethylbenzoyl diphenylphosphine oxide, bis(2,4,6-trimethylbenzoyl)-phenylphosphine oxide, or bis(2,6-dimethylbenzoyl)-2,4,4-trimethylpentylphosphine oxide.

As a commercially available product of the acylphosphine oxide-based photopolymerization initiator described above, for example, there may be mentioned IRGACURE (registered trademark) 819 (bis(2,4,6-trimethylbenzoyl)-phenylphosphine oxide), IRGACURE 1800 (mixture of bis(2, 6-dimethoxybenzoyl)-2,4,4-trimethylpentylphosphine oxide and 1-hydroxy-cyclohexyl-phenylketone at a mass ratio of 25:75), or IRGACURE TPO (2,4,6-trimethylbenzoyl)diphenylphosphine oxide), each of which is manufactured by BASF.

The content of the photopolymerization initiator contained in the clear ink with respect to the total mass of the clear ink is preferably 3 to 12 percent by mass, more preferably 5 to 10 percent by mass, and further preferably 7 to 9 percent by mass. Accordingly, the curing property of the clear ink is improved, and in addition, the solubility of the photopolymerization initiator is secured.

1.1.3. Other Additives

The clear ink may further contain, if needed, other additives, such as a polymerization inhibitor, a slip agent, and/or a photosensitizer.

1.1.3.1. Polymerization Inhibitor

The polymerization inhibitor has a function to improve storage stability of the clear ink by suppressing the progress of an unintended polymerization reaction of the polymerizable compounds during storage or the like. The polymerization inhibitors may be used alone, or at least two types thereof may be used in combination.

Although the polymerization inhibitor is not particularly limited, for example, there may be mentioned 4-methoxyphenol (MEHQ), 4-hydroxy-2,2,6,6-tetramethylpyperidine-N-oxyl, hydroquinone, cresol, t-butylcatechol, 3,5-di-t-butyl-4-hydroxytoluene, 2,2'-methylene-bis(4-methyl-6-t-butylphenol), 2,2'-methylenebis(4-ethyl-6-butylphenol), 4,4'-thiobis(3-methyl-6-t-butylphenol), or a hindered amine compound.

The content of the polymerization inhibitor contained in the clear ink with respect to the total mass of the clear ink is preferably 0.05 to 1.00 percent by mass and more preferably 0.05 to 0.50 percent by mass.

1.1.3.2. Slip Agent

The slip agent has a function to improve the abrasion resistance of the coating film of the clear ink. The slip agents may be used alone, or at least two types thereof may be used in combination.

As the slip agent, a silicone-based surfactant is preferable, and a polyester-modified silicone or a polyether-modified silicone is more preferable. As the slip agent described above, a commercially available product may be used, and for example, a polyester-modified silicone, such as BYK (registered trademark)-347 or -348, BYK-UV3500, -3510, or -3530, or a polyether modified silicone, such as BYK-3570, each of which is manufactured by BYK Additives & Instruments, may be mentioned.

The content of the slip agent contained in the clear ink with respect to the total mass of the clear ink is preferably 0.01 to 2.00 percent by mass and more preferably 0.05 to 1.00 percent by mass.

1.1.3.3. Photosensitizer

The photosensitizer is placed in an excited state by absorption of radiation rays and functions to promote the generation of the active species from the photopolymerization initiator. The photosensitizers may be used alone, or at least two types thereof may be used in combination.

As the photosensitizer, for example, there may be mentioned an amine compound, such as an aliphatic amine, an amine containing an aromatic group, piperidine, a reaction product between an epoxy resin and an amine, or triethanolamine triacrylate; an urea compound, such as allylthiourea or o-tolylthiourea; a sulfur compound, such as sodium diethyl dithiophosphate or a soluble salt of an aromatic sulphinic acid; a nitrile-based compound, such as N,N-diethyl-p-aminobenzonitrile; a phosphorous compound, such as tri-n-butylphosphine or sodium diethyldithiophosphide; a nitrogen-containing compound, such as Michler's ketone, a N-nitrosohydroxylamine derivative, an oxazolidine compound, a tetrahydro-1,3-oxazine compound, or a condensate between a diamine and formaldehyde or acetaldehyde; or a chloride compound, such as carbon tetrachloride or hexachloroethane.

When the photosensitizer is used for the clear ink, the content of the photosensitizer with respect to the total mass of the clear ink is preferably 0.5 to 3.0 percent by mass.

1.2. Color Ink

The color ink according to this embodiment includes polymerizable compounds, a photopolymerization initiator, and a colorant. The color ink is used to color a recording medium or to form an image or the like on a recording medium. Hereinafter, components contained in the color ink will be described.

1.2.1. Polymerizable Compound

As the polymerizable compounds, a monofunctional monomer having one polymerizable functional group, a multifunctional monomer having a plurality of polymerizable functional groups, and an oligomer having at least one polymerizable functional group are included. Those polymerizable compounds may be used alone, or at least two types thereof may be used in combination.

When a mass ratio of the contents of the polymerizable compounds contained in the color ink is regarded as a weight basis, the weighted average of glass transition temperatures of homopolymers of the respective polymerizable compounds is 48° C. or more. The weighted average of the glass transition temperatures is preferably 70° C. or more and more preferably 85° C. or more. Since the weighted average of the glass transition temperatures is 48° C. or more, the abrasion resistance of the coating film in a room temperature environment can be improved. Although not particularly limited, the upper limit of the weighted average of the glass transition temperatures is preferably 140° C. or less, more preferably 120° C. or less, and further preferably 110° C. or less.

A method for calculating the weighted average of the glass transition temperatures is similar to that described for the clear ink. In addition, the weighted average of the glass transition temperatures may be adjusted by the glass transition temperatures and the mass ratio of the polymerizable compounds to be used for the color ink.

1.2.1.1. Monofunctional Monomer

The polymerizable compounds contained in the color ink include the monofunctional monomer. Although the monofunctional monomer is not particularly limited, for example, a nitrogen-containing monofunctional monomer, a monofunctional (meth)acrylate having a cross-linked condensed ring structure, an aromatic group-containing monofunctional monomer, or a saturated aliphatic group-containing monofunctional monomer may be mentioned. In addition, if needed, at least one other monofunctional monomer may also be used instead of or besides the monofunctional monomer mentioned above. In addition, although the polymerizable functional group of the monofunctional monomer is not particularly limited, a known polymerizable functional group, in particular, a polymerizable functional group having an unsaturated double bond between carbons, may be used.

The content of the monofunctional monomer contained in the color ink with respect to the total mass of the polymerizable compounds contained in the color ink is 85 percent by mass or more and preferably 90 percent by mass or more. Accordingly, the coating film of the color ink becomes flexible, and the stretching property thereof can be improved. In addition, when the content of the monofunctional monomer contained in the color ink is 85 percent by mass or more, since the gloss of a related clear ink is liable to be degraded, the present disclosure is particularly effective.

Although not particularly limited, the upper limit of the content of the above monofunctional monomer with respect to the total mass of the polymerizable compounds contained in the color ink is preferably 99 percent by mass or less, more preferably 98 percent by mass or less, and further preferably 97 percent by mass or less. Accordingly, the abrasion resistance of the coating film of the color ink can be improved.

In addition, the content of the monofunctional monomer contained in the color ink with respect to the total mass of the color ink is preferably 65 percent by mass or more, more preferably 70 percent by mass or more, and further preferably 75 percent by mass or more. Accordingly, the stretching property of the coating film of the color ink is further improved. In addition, the upper limit of the content of the above monofunctional monomer with respect to the total mass of the color ink is preferably 97 percent by mass or less, more preferably 95 percent by mass or less, and further preferably 90 percent by mass or less. Accordingly, the curing property of the color ink is improved.

As the nitrogen-containing monofunctional monomer, the monofunctional (meth)acrylate having a cross-linked condensed ring structure, the aromatic group-containing monofunctional monomer, the saturated aliphatic group-containing monofunctional monomer, and the monofunctional monomer other than those mentioned above, each of which is contained in the color ink, monomers similar to those for the clear ink may also be used. In addition, in the monofunctional monomer to be contained in the color ink, a monomer corresponding to the monomer A or the monomer B may also be included.

The content of the nitrogen-containing monofunctional monomer contained in the color ink with respect to the total mass of the polymerizable compounds is preferably 3 to 17 percent by mass, more preferably 5 to 15 percent by mass, and further preferably 8 to 12 percent by mass. Accordingly, the abrasion resistance and the adhesion of the coating film of the color ink are improved.

The content of the nitrogen-containing monofunctional monomer contained in the color ink with respect to the total mass of the color ink is preferably 3 to 17 percent by mass, more preferably 5 to 15 percent by mass, and further preferably 8 to 12 percent by mass. Accordingly, the abrasion resistance and the adhesion of the coating film of the color ink are improved.

The content of the monofunctional (meth)acrylate having a cross-linked condensed ring structure contained in the color ink with respect to the total mass of the polymerizable compounds is preferably 20 to 55 percent by mass, more preferably 25 to 50 percent by mass, and further preferably 30 to 45 percent by mass. Accordingly, the adhesion and the abrasion resistance of the coating film of the color ink are improved.

The content of the monofunctional (meth)acrylate having a cross-linked condensed ring structure contained in the color ink with respect to the total mass of the color ink is preferably 15 to 50 percent by mass, more preferably 20 to 45 percent by mass, and further preferably 25 to 40 percent by mass. Accordingly, the adhesion and the abrasion resistance of the coating film of the color ink are improved.

The content of the aromatic group-containing monofunctional monomer contained in the color ink with respect to the total mass of the polymerizable compounds is preferably 2 to 12 percent by mass, more preferably 3 to 10 percent by mass, and further preferably 4 to 7 percent by mass. Accordingly, the adhesion and the abrasion resistance of the coating film of the color ink are improved.

The content of the aromatic group-containing monofunctional monomer contained in the color ink with respect to the total mass of the color ink is preferably 2 to 12 percent by mass, more preferably 3 to 10 percent by mass, and further preferably 4 to 7 percent by mass. Accordingly, the adhesion and the abrasion resistance of the coating film of the color ink are improved.

The content of the saturated aliphatic group-containing monofunctional monomer contained in the color ink with respect to the total mass of the polymerizable compounds is preferably 15 to 45 percent by mass, more preferably 20 to 40 percent by mass, and further preferably 25 to 35 percent by mass. Accordingly, the curing property of the color ink is improved.

The content of the saturated aliphatic group-containing monofunctional monomer contained in the color ink with respect to the total mass of the color ink is preferably 15 to 40 percent by mass, more preferably 20 to 35 percent by mass, and further preferably 25 to 30 percent by mass. Accordingly, the curing property of the color ink is improved.

1.2.1.2. Multifunctional Monomer

The polymerizable compounds contained in the color ink preferably include the multifunctional monomer. As the multifunctional monomer, for example, a vinyl ether group-containing (meth)acrylate or a multifunctional (meth)acrylate may be mentioned. In addition, the multifunctional monomer is not limited to those mentioned above. As the multifunctional monomer, a monomer similar to that for the clear ink may also be used. In addition, in the multifunctional monomer contained in the color ink, a monomer corresponding to the monomer A or the monomer B described above may also be included.

The content of the multifunctional monomer contained in the color ink with respect to the total mass of the polymerizable compounds is preferably 0.01 to 20.00 percent by mass, more preferably 0.01 to 15.00 percent by mass, and further preferably 1.00 to 15.00 percent by mass. Since the content of the multifunctional monomer is 0.01 percent by mass or more, the abrasion resistance of the coating film of the color ink is improved. In addition, since the content of the multifunctional monomer is 20.00 percent by mass or less, the stretching property and the adhesion of the coating film tend to be further improved.

The content of the multifunctional monomer contained in the color ink with respect to the total mass of the color ink is preferably 0.01 to 15.00 percent by mass, more preferably 0.50 to 15.00 percent by mass, and further preferably 1.00 to 15.00 percent by mass. Since the content of the multifunctional monomer is 0.01 percent by mass or more, the abrasion resistance of the coating film of the color ink is improved. In addition, since the content of the multifunctional monomer is 15.00 percent by mass or less, the stretching property and the adhesion of the coating film of the color ink tend to be improved.

The content of the vinyl ether group-containing (meth)acrylate contained in the color ink with respect to the total mass of the polymerizable compounds is preferably 1 to 10 percent by mass, more preferably 2 to 8 percent by mass, and further preferably 2 to 6 percent by mass. Accordingly, the viscosity of the color ink is decreased, and hence, the ejection stability of the color ink from an ink jet head is improved.

The content of the vinyl ether group-containing (meth)acrylate contained in the color ink with respect to the total mass of the color ink is preferably 1 to 10 percent by mass, more preferably 1 to 8 percent by mass, and further preferably 2 to 6 percent by mass. Accordingly, the viscosity of the color ink is decreased, and hence, the ejection stability of the color ink from an ink jet head is improved.

The content of the multifunctional (meth)acrylate contained in the color ink with respect to the total mass of the polymerizable compounds is preferably 1 to 20 percent by mass, more preferably 1 to 17 percent by mass, and further preferably 2 to 15 percent by mass. Since the content of the multifunctional (meth)acrylate is 1 percent by mass or more, the abrasion resistance of the coating film of the color ink is improved. In addition, since the content of the multifunctional (meth)acrylate is 20 percent by mass or less, the stretching property and the adhesion of the coating film of the color ink are improved.

The content of the multifunctional (meth)acrylate contained in the color ink with respect to the total mass of the color ink is preferably 1 to 20 percent by mass, more preferably 1 to 17 percent by mass, and further preferably 2 to 15 percent by mass. Since the content of the multifunctional (meth)acrylate is 1 percent by mass or more, the abrasion resistance of the coating film of the color ink is improved. In addition, since the content of the multifunctional (meth)acrylate is 20 percent by mass or less, the stretching property and the adhesion of the coating film of the color ink tend to be improved.

1.2.2. Photopolymerization Initiator

As the photopolymerization initiator contained in the color ink, a material similar to that for the clear ink may also be used. The content of the photopolymerization initiator contained in the color ink with respect to the total mass of the color ink is preferably 3 to 12 percent by mass, more preferably 5 to 10 percent by mass, and further preferably 7 to 9 percent by mass. Accordingly, the curing property of the color ink is improved, and in addition, the solubility of the photopolymerization initiator is secured.

1.2.3. Colorant

The colorant has a function to color a coating film formed by the color ink. Since the coating film of the color ink is colored, the coloration of a recording medium and the formation of a color image thereon can be performed. As the colorant contained in the color ink, a pigment and a dye may be mentioned.

1.2.3.1. Pigment

Since the pigment is used as the colorant, light resistance of the colorant in the coating film of the color ink can be improved. As the pigment, either an inorganic pigment or an organic pigment may be used. The pigments may be used alone, or at least two types thereof may be used in combination.

As the pigment, known organic and inorganic pigments may both be used. As the organic pigment, for example, there may be mentioned an azo pigment, such as an azo lake pigment, an insoluble azo pigment, a condensed azo pigment, or a chelate azo pigment; a multicyclic pigment, such as a phthalocyanine pigment, a perylene pigment, a perinone pigment, an anthraquinone pigment, a quinacridone pigment, a dioxazine pigment, a thioindigo pigment, an isoindolinone pigment, an isoindoline pigment, a quinophthalone pigment, or a diketopyrrolopyrrole pigment; a dye lake pigment, such as a basic dye type lake or an acidic dye type lake; a nitro pigment, a nitroso pigment, aniline black, or a daylight fluorescent pigment. As the inorganic pigment, for example, there may be mentioned a metal oxide pigment, such as titanium dioxide, zinc oxide, or chromium oxide; or carbon black. In addition, a bright pigment, such as a pearl pigment or a metallic pigment, may also be used.

As a black pigment, for example, there may be mentioned C.I. (Colour Index Generic Name) Pigment Black 1, 7, or 11 may be mentioned. Among those mentioned above, C.I. Pigment Black 7 which is carbon black is preferably used.

As a concrete example of the carbon black, for example, there may be mentioned No. 2300, No. 900, MCF88, No. 33, No. 40, No. 45, No. 52, MA7, MA8, MA100, or No. 2200B, each manufactured by Mitsubishi Chemical Co., Ltd.; Raven (registered trademark) 5750, 5250, 5000, 3500, 1255, or 700, each manufactured by Colombia Carbon Co., Ltd.; Regal (registered trademark) 400R, 330R, or 660R, Mogul (registered trademark) L, or Monarch (registered trademark) 700, 800, 880, 900, 1000, 1100, 1300, or 1400, each manufactured by CABOT; Color Black FW1, FW2, FW2V, FW18, FW200, 5150, 5160, or 5170, Printex (registered trademark) 35, U, V, or 140U, or SpecialBlack 6, 5, 4A, or 4, each manufactured by Degussa.

As a white pigment, for example, C.I. Pigment White 6, 18, or 21 may be mentioned.

As a yellow pigment, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, or 180.

As a magenta pigment, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245; C.I. Pigment Violet 19, 23, 32, 33, 36, 38, 43, or 50.

As a cyan pigment, for example, there may be mentioned C.I. Pigment Blue 1, 2, 3, 15, 15:1, 15:2, 15:3, 15:34, 15:4, 16, 18, 22, 25, 60, 65, or 66; or C.I. Vat Blue 4 or 60.

As pigments other than those mentioned above, for example, there may be mentioned C.I. Pigment Green 7 or 10; C.I. Pigment Brown 3, 5, 25, or 26; C.I. Pigment Orange 1, 2, 5, 7, 13, 14, 15, 16, 24, 34, 36, 38, 40, 43, or 63.

The pigments mentioned above may be used alone, or at least two types thereof may be used in combination. When the pigment is used, a dispersant which will be described later may also be used in combination. In addition, the average particle diameter of the pigment is preferably 300 nm or less and more preferably 50 to 200 nm. When the average particle diameter of the pigment is in the range described above, as the color ink of the radiation curable type ink jet ink, for example, the ejection stability and the dispersion stability are improved, and in addition, the quality of an image to be formed on a recording medium can be improved. In addition, the average particle diameter of this embodiment indicates a volume-based particle size distribution (50%) measured by a dynamic light scattering method.

The content of the pigment contained in the color ink with respect to the total mass of the color ink is more than 0.2 to 20 percent by mass, preferably 1 to 20 percent by mass, more preferably 1 to 15 percent by mass, and further preferably 1 to 10 percent by mass.

1.2.3.2. Dye

As the colorant, the dye may also be used. Although the dye is not particularly limited, for example, an acidic dye, a direct dye, a reactive dye, or a basic dye may be used. The dyes may be used alone, or at least two types thereof may be used in combination.

Although the dye is not particularly limited, for example, there may be mentioned C.I. Acid Yellow 17, 23, 42, 44, 79, or 142; C.I. Acid Red 52, 80, 82, 249, 254, or 289; C.I. Acid Blue 9, 45, or 249, C.I. Acid Black 1, 2, 24, or 94; C.I. Food Black 1 or 2; C.I. Direct Yellow 1, 12, 24, 33, 50, 55, 58, 86, 132, 142, 144, or 173; C.I. Direct Red 1, 4, 9, 80, 81, 225, or 227; C.I. Direct Blue 1, 2, 15, 71, 86, 87, 98, 165, 199, or 202; C.I. Direct Black 19, 38, 51, 71, 154, 168, 171, or 195: C.I. Reactive Red 14, 32, 55, 79, or 249; C.I. Reactive Black 3, 4, or 35.

When the dye is used for the color ink, the content of the dye with respect to the total mass of the color ink is more than 0.2 to 20.0 percent by mass, preferably 1.0 to 20.0 percent by mass, more preferably 1.0 to 15.0 percent by mass, and further preferably 1.0 to 10.0 percent by mass.

1.2.4. Other Additives

The color ink may further contain, if needed, other additives, such as a dispersant, a polymerization inhibitor, a slip agent, and/or a photosensitizer.

1.2.4.1. Dispersant

The dispersant has a function to impart dispersibility to the colorant, such as a pigment, in the color ink. Since the dispersant is used, the pigment and the like are stably dispersed in the color ink, and for example, a sedimentation resistance during the storage and the ejection stability from an ink jet head are improved.

Although the dispersant is not particularly limited, for example, a known dispersant, such as a polymer dispersant, which has been generally used to prepare a pigment dispersion liquid may be mentioned. As a concrete example of the dispersant, there may be mentioned a dispersant containing, as a primary component, at least one selected from a polyoxyalkylene polyalkylene polyamine, a vinyl-based polymer and its copolymer, an acrylic-based polymer and its copolymer, a polyester, a polyamide, a polyimide, a polyurethane, an amino-based polymer, a silicon-containing polymer, a sulfur-containing polymer, a fluorine-containing polymer, and an epoxy resin. The dispersants may be used alone, or at least two types thereof may be used in combination.

As the polymer dispersant, a commercially available product may also be used, and for example, there may be mentioned Adisper (registered trademark) series manufactured by Ajinomoto Fine-Techno Co., Inc., Solsperse (registered trademark) series, such as Solsperse36000, manufactured by Lubrizol, Disperbyk series manufactured by BYK Additives & Instruments, and Disperlon (registered trademark) series manufactured by Kusumoto Chemicals, Ltd.

1.2.4.2. Polymerization Inhibitor

As the polymerization inhibitor, materials similar to those for the clear ink may also be used. The polymerization inhibitors may be used alone, or at least two types thereof may be used in combination. The content of the polymerization inhibitor contained in the color ink with respect to the total mass of the color ink is preferably 0.05 to 1.00 percent by mass and more preferably 0.05 to 0.50 percent by mass.

1.2.4.3 Slip Agent

As the slip agent, materials similar to those for the clear ink may also be used. The slip agents may be used alone, or at least two types thereof may be used in combination. The content of the slip agent contained in the color ink with respect to the total mass of the color ink is preferably 0.01 to 2.00 percent by mass and more preferably 0.05 to 1.00 percent by mass.

1.2.4.4 Photosensitizer

As the photosensitizer, materials similar to those for the clear ink may also be used. The photosensitizers may be used alone, or at least two types thereof may be used in combination. The content of the photosensitizer contained in the color ink with respect to the total mass of the color ink is preferably 0.01 to 5.00 percent by mass.

1.3. Method for Preparing Clear Ink and Color Ink

In the preparation of the clear ink and the color ink, the components described above are mixed together, and sufficient stirring is then performed so that the components are uniformly mixed together. In this embodiment, in the preparation process, at least one of an ultrasonic treatment and a heating treatment is to be performed on a mixture in which the photopolymerization initiator and the polymerizable compounds are at least partially mixed together. Accordingly, in the color ink and the clear ink thus prepared, the amount of dissolved oxygen is reduced, and hence, the ejection stability and the storage stability can be improved. In addition, in the following description, the color ink and the clear ink may be simply collectively called "ink" in some cases.

The mixture described above may be a mixture containing at least parts of the photopolymerization initiator and the polymerizable compounds, a mixture further containing other components besides the components described above, or a mixture containing all the components of the ink.

1.4. Physical Property of Ink

The viscosity of the ink at 20° C. is preferably 22 to 28 mPa·s (millipascal·second), more preferably 22 to 26 mPa·s, and further preferably 22 to 24 mPa·s. Accordingly, an appropriate amount of the ink is ejected from an ink jet head, and hence, flight bending and/or scattering of an ink liquid droplet can be suppressed. In addition, the viscosity of the ink can be measured using a viscoelastic tester MCR-300 manufactured by Pysica such that in an environment at 20° C., while the shear rate is increased from 10 to 1,000, a viscosity at a shear rate of 200 is read.

The surface tension of the ink at 20° C. is preferably 20 to 40 mN/m. Accordingly, a nozzle surface of an ink jet head processed by a liquid repellent treatment is not likely to be wetted with the ink. Hence, the ink in an appropriate amount is normally ejected from the ink jet head, and the flight bending and/or scattering of the ink liquid droplet can be suppressed. In addition, the surface tension of the ink can be measured using an automatic surface tension meter CBVP-Z manufactured by Kyowa Interface Science Co., Ltd. such that a surface tension at which a platinum plate is wetted with the ink in an environment at 20° C. is confirmed.

2.1. Ink Jet Recording Apparatus

Next, as an ink jet recording apparatus using an ink jet method of this embodiment which will be described later, a serial type ink jet printer is show by way of example. FIGURE is a schematic perspective view showing the structure of an in jet printer according to this embodiment. In addition, in FIGURE, in order to visually recognize the sizes of individual members, the scales of the members are made different from the actual scales.

An ink jet printer 1 according to this embodiment is a so-called serial type printer. The serial type printer is a printer in which an ink jet head is mounted on a carriage which is transferred in a predetermined direction, and while the ink jet head is transferred in association with the transfer of the carriage, printing is performed. Hereinafter, the ink jet printer 1 is simply called "printer 1" in some cases.

As shown in FIGURE, the printer 1 includes an ink jet head 3, a carriage 4, a main scanning mechanism 5, a platen roller 6, a light source 11, and a control portion (not shown) controlling the entire operation of the printer 1. The carriage 4 mounts the ink jet head 3 together with the light source 11 and also detachably holds ink cartridges 7a, 7b, 7c, 7d, and 7e each functioning as a container in which an ink to be supplied to the ink jet head 3 is received.

The main scanning mechanism 5 includes a timing belt 8 coupled to the carriage 4, a motor 9 driving the timing belt 8, and a guide shaft 10. The guide shaft 10 is provided as a support member for the carriage 4 in a main scanning direction which is a scanning direction of the carriage 4. The carriage 4 is driven by the motor 9 through the timing belt 8 and can be reciprocally transferred along the guide shaft 10. Accordingly, the main scanning mechanism 5 reciprocally transfers the carriage 4 in the main scanning direction.

The platen roller 6 transports a recording medium 2 to which the ink is to be adhered in a sub-scanning direction orthogonal to the main scanning direction. Hence, the recording medium 2 is transported in the sub-scanning direction which approximately coincides with a length direction of the recording medium 2. The carriage 4 can be reciprocally transferred in the main scanning direction which approximately coincides with a width direction of the recording medium 2. Hence, the ink jet head 3 and the light source 11 can be relatively scanned with respect to the recording medium 2 in the main scanning direction and the sub-scanning direction.

The ink cartridges 7a, 7b, 7c, 7d, and 7e are independent five ink cartridges. In the ink cartridges 7a, 7b, 7c, 7d, and 7e, the color inks and the clear ink described above are received. For example, in the ink cartridges 7a, 7b, 7c, 7d, and 7e, color inks having colors, such as black, cyan, magenta, and yellow, and the clear ink may be received, respectively, so as to be used as an ink set. In FIGURE, although the number of the cartridges is set to five, the number thereof is not limited thereto. In bottom portions of the ink cartridges 7a, 7b, 7c, 7d, and 7e, supply ports (not shown) to supply the inks thus received to the ink jet head 3 are provided.

For the members of the ink cartridges 7a to 7e, a material which is not likely to cause evaporation and degradation of the ink components and which is not likely to be degraded by the ink components is used. In this embodiment, as the container of the ink, although the ink cartridge is shown by way of example, the container is not limited thereto, and besides the ink cartridge, an ink pack, an ink bottle, or the like may also be used as the container of the ink.

At a side of the carriage 4 facing the recording medium 2, the ink jet head 3 and the light source 11 are disposed. The ink jet head 3 has a nozzle surface (not shown) at the surface facing the recording medium 2. On the nozzle surface, for example, a polymer film containing a fluorine compound and a silicone compound or a co-deposited plating film containing nickel and a fluorine compound may be formed as a liquid repellent film. In addition, although not shown in the drawing, in the nozzle surface, nozzle lines each formed from a plurality of ejection nozzles are separately disposed for the respective inks. In addition, the inks are supplied from the ink cartridges 7a, 7b, 7c, 7d, and 7e to the ink jet head 3 and are then ejected in the form of liquid droplets from the ejection nozzles by actuators (not shown) in the ink jet head 3. The liquid droplets thus ejected are landed on and adhered to the recording medium 2.

In addition, in this embodiment, as the printer 1, although the structure in which one ink jet head 3 ejects the color inks and the clear ink is shown by way of example, the structure is not limited thereto. The printer 1 may separately include an ink jet head which ejects the color inks and an ink jet head which ejects the clear ink.

In the ink jet head 3, as the actuator which is a diving device, although a piezoelectric element is used, the actuator is not limited thereto. As the driving device, for example, there may be used an electromechanical conversion element which displaces a vibration plate functioning as an actuator by electrostatic absorption or an electrothermal conversion element which ejects the ink in the form of liquid droplets by bubbles generated by heating.

The light source 11 is disposed adjacent to the ink jet head 3 along the main scanning direction. The light source 11 is a radiation emitting device and, for example, includes a light-emitting element (not shown), such as an ultraviolet light-emitting diode (UV-LED). The radiation rays to be emitted from the light source 11 are not limited to ultraviolet rays and may be infrared rays, electron rays, visible rays, X-rays, or the like. In this embodiment, for the light source 11, although a lamp may also be used instead of a light-emitting diode (LED) or a laser diode (LD), for example, in view of the reduction in size and cost, a light-emitting element is preferably used.

Since the radiation rays are emitted from the light source 11 on the ink liquid droplets adhered to the recording medium 2, a photopolymerization reaction of the polymerizable compounds in the ink proceeds, and the ink liquid droplets are cured, so that the coating film of the ink is formed. Accordingly, the coloration of the recording medium 2, the formation of an image, a color, a letter, a pattern, and the like on the recording medium 2, and the formation of the coating film of the clear ink are performed.

In this embodiment, the light source 11 is not limited to be disposed adjacent to the ink jet head 3 along the main scanning direction and may be disposed with respect to the ink jet head 3 along the sub-scanning direction at a side opposite to the direction in which the recording medium 2 is transferred. In addition, the light source 11 is not limited to be disposed on the carriage 4 and may be provided separately therefrom.

In this embodiment, although the on-carriage type printer 1 is shown by way of example as the ink jet recording apparatus, the printer is not limited thereto. The ink jet recording apparatus may be an off-carriage type, such as a large format printer, in which ink containers are not mounted on a carriage. In addition, the ink jet recording apparatus used in this embodiment is not limited to a serial printer and may be a line head printer in which an ink jet head is formed to have a width equivalent to or more than the width of the recording medium 2, and printing is performed without transferring the ink jet head.

2.2. Recording Medium

The recording medium 2 is appropriately selected, for example, in accordance with application of a printed matter to be formed from the ink and a recording medium. Although a material forming the recording medium 2 is not particularly limited, for example, there may be mentioned a plastic, such as a poly(vinyl chloride) (hereinafter, referred to as "PVC" in some cases), a poly(ethylene terephthalate), a polypropylene, a polyethylene, a polycarbonate, a cellulose diacetate, a cellulose triacetate, a cellulose propionate, a cellulose lactate, a cellulose acetate lactate, a cellulose nitrate, a polystyrene, or a poly(vinyl acetal); at least one of the plastics mentioned above processed by a surface treatment; or glass, paper, a metal, or wood.

The form of the recording medium 2 is not particularly limited, and for example, a film, a sheet, a board, or a cloth may be mentioned. Since the stretching property, the abrasion resistance, and the like are improved by the ink set of this embodiment, when a post processing is performed on a printed matter for signage application, breakage and/or peeling of the coating film of the ink is not likely to be generated by cutting and/or bending. In addition, since the gloss of the coating film of the clear ink is improved, the ink set of this embodiment can be preferably applied to the signage application.

3. Ink Jet Method

The ink jet method according to this embodiment includes, by using the ink set described above, a first ejection step of ejecting the color ink from the ink jet head 3 to be adhered to the recording medium 2; a first curing step of emitting radiation rays on the color ink adhered to the recording medium 2; a second ejection step of ejecting the clear ink from the ink jet head 3 to be adhered to a region of the recording medium 2 including the color ink irradiated with the radiation rays; a leveling step of allowing the recording medium 2 to which the clear ink is adhered to stand still; and a second curing step of emitting radiation rays on the clear ink adhered to the recording medium 2. Hereinafter, the steps included in the ink jet method of this embodiment will be described with reference to FIGURE.

3.1. First Ejection Step

In the first ejection step, the color ink is ejected from the ink jet head 3 to be adhered to the recording medium 2. In particular, by driving a piezoelectric element, the color ink filled in a pressure generation chamber of the ink jet head 3 is ejected from an ejection nozzle. The ejection method as described above is also called an ink jet method. In this step, a multi-pass in which the carriage 4 is reciprocally transferred with respect to a predetermined position of the recording medium 2 in the main scanning direction at least two times may be carried out. That is, while the transport of the recording medium 2 in the sub-scanning direction is stopped for a predetermined period, the ejection of the color ink is performed by the multi-pass, and subsequently, after the recording medium 2 is transported by a short distance, and the multi-pass is again performed.

While the ink jet head 3 is relatively transferred with respect to the recording medium 2, since the color ink is adhered thereto, a liquid layer of the color ink which is to be used as a base of a desired image or the like is formed on the recording medium 2.

3.2. First Curing Step

In the first curing step, the radiation rays are emitted on the liquid layer of the color ink adhered to the recording medium 2 from the light source 11 to cure the color ink on the recording medium 2, so that the coating film of the color ink is formed. In particular, while the carriage 4 is transferred with respect to a predetermined position of the recording medium 2 in the main scanning direction, the radiation rays are emitted from the light source 11 to the recording medium 2. The transfer of the carriage 4 in the main scanning direction may be performed once or repeatedly. In addition, a region of the recording medium 2 to which the radiation rays are emitted may include a region to which the color ink is adhered. By the emission of the radiation rays, the liquid layer of the color ink on the recording medium 2 is cured, so that the coating film of the color ink is formed. In addition, with respect to a specific position on the recording medium 2, the first ejection step and the first curing step may be either repeated or not.

3.3. Second Ejection Step

In the second ejection step, the clear ink is ejected from the ink jet head 3 to be adhered to the recording medium 2. In this step, a region to which the clear ink is adhered may include a region on the recording medium 2 in which the coating film of the color ink is formed. That is, the clear ink may be not adhered to a region in which no coating film of the color ink is formed or may be solidly adhered to approximately over the entire surface of the recording medium 2 including the region in which no coating film of the color ink is formed. In addition, as is the case of the color ink in the first ejection step, the second ejection step may be performed by a multi-pass or a single pass which performs no multi-pass. Accordingly, at least on the coating film of the color ink, a liquid layer of the clear ink is formed.

3.4. Leveling Step

The ink jet method includes, between the second ejection step and the second curing step which will be described below, the leveling step of allowing the recording medium 2 to which the clear ink is adhered to stand still for a predetermined time. Since the leveling step is performed, the liquid layer of the clear ink is flattened on the coating film of the color ink. Hence, after the liquid layer of the clear ink is flattened, the coating film of the clear ink is formed from the liquid layer by the second curing step which will be described below. Accordingly, the flatness of the coating film of the clear ink is increased, and the gloss of the coating film of the clear ink is further improved.

In this embodiment, the term "to stand still" indicates that the second curing step of emitting radiation rays is not performed on the recording medium 2 to which the clear ink is adhered in the second ejection step. Hence, in the leveling step, for example, the recording medium 2 may be transported in the sub-scanning direction.

A stand-still time in the leveling step is preferably 1 to 120 seconds, more preferably 2 to 100 seconds, and further preferably 4 to 80 seconds. According to the time described above, since the liquid layer of the clear ink is sufficiently flattened on the coating film of the color ink, the gloss of the coating film of the clear ink is further improved.

In addition, although including the leveling step, the ink jet method of this embodiment is not limited thereto. When the gloss of the coating film of the clear ink is secured, the leveling step may be omitted. In order to further improve the gloss described above, the leveling step is preferably provided.

3.5. Second Curing Step

In the second curing step, the radiation rays are emitted on the liquid layer of the clear ink adhered to the recording medium 2 from the light source 11 to cure the clear ink, so that the coating film of the clear ink is formed. In particular, while the carriage 4 is transferred in the main scanning direction with respect to the predetermined position on the recording medium 2 which includes the coating film of the color ink, the radiation rays are emitted from the light source 11 to the recording medium 2. The transfer of the carriage 4 in the main scanning direction may be performed once or repeatedly. In addition, a region of the recording medium 2 to which the radiation rays are emitted may include a region to which the clear ink is adhered. By the emission of the radiation rays, the liquid layer of the clear ink on the recording medium 2 is cured, and the coating film of the clear ink is formed. In addition, with respect to the specific position on the recording medium 2, the second ejection step to the second curing step may be performed once or repeatedly.

According to this embodiment, the following advantages can be obtained.

In the clear ink, the gloss of the coating film can be improved, and in addition, the generation of the odor from the coating film can also be suppressed. In particular, the monomer B has a bulky molecular structure. Since the monomer B is used, the gloss of the coating film formed from the clear ink can be improved. Since the monomer A has a hydroxy group in its molecular structure, compared to a polymerizable compound having a bulky molecular structure, the odor is not likely to be generated from the coating film. Hence, when the monomer A is used together with the monomer B, the odor generated from the coating film can be suppressed. In addition, since having a minor effect on the gloss of the coating film, the monomer A does not degrade the gloss of the coating film.

Furthermore, since the total content of the monomer A and the monomer B is 80 percent by mass or more, when a polymerizable compound, such as PEA, other than the monomer A and the monomer B is contained, the content of the polymerizable compound other than the monomer A and the monomer B is inevitably decreased. Accordingly, an ink set in which in the clear ink, the gloss of the coating film is not only improved but the generation of the odor from the coating film is also suppressed can be provided.

Since the content of the monomer A with respect to the total mass of the polymerizable compounds contained in the clear ink is 5 percent by mass or more, the odor generated from the coating film can be further suppressed. In addition, since the content of the monomer A is 15 percent by mass or less, an excessive increase in viscosity of the clear ink can be suppressed. Since the content of the monomer B with respect to the total mass of the polymerizable compounds contained in the clear ink is 70 percent by mass or more, the gloss of the coating film of the clear ink can be further improved.

Since the content of the monofunctional monomer with respect to the total mass of the polymerizable compounds contained in the clear ink is 85 percent by mass or more, the stretching property of the coating film of the clear ink is improved. Hence, even when the coating film is formed on a flexible sheet for signage application or the like, the breakage and/or the peeling is not likely to occur. That is, an ink set preferable for the signage application can be provided.

Since the content of the multifunctional monomer with respect to the total mass of the clear ink is 0.01 to 15.00 percent by mass, a cross-linked structure is formed in the coating film by the multifunctional monomer, and compared to the case in which the multifunctional monomer is not used, the curing property of the clear ink and the abrasion resistance of the coating film can be improved. In addition, since the content of the multifunctional monomer is 15.00 percent by mass or less, the stretching property of the coating film can be secured.

When the mass ratio of the contents of the polymerizable compounds contained in the clear ink is regarded as a weight basis, the weighted average of the glass transition temperatures of the homopolymers of the respective polymerizable compounds is 48° C. or more, and hence, the abrasion resistance of the coating film of the clear ink can be improved.

Since the content of the monofunctional monomer with respect to the total mass of the polymerizable compounds contained in the color ink is 85 percent by mass or more, the clear ink described above can be preferably used for the color ink. In particular, when the coating film of the clear ink is formed on the coating film of the color ink, if a large amount of the monofunctional monomer is contained in the clear ink, heretofore, the gloss of the coating film of the clear ink is liable to be degraded. On the other hand, according to the clear ink of the present disclosure, the gloss of the coating film of the clear ink can be improved.

By the ink jet method, the coating film of the clear ink is formed on the coating film of the color ink. Hence, the coating film of the clear ink not only protects the coating film of the color ink but also improves the gloss. Accordingly, a printed matter in which the abrasion resistance and the gloss of the color ink are improved can be formed.

In the leveling step, the liquid layer of the clear ink adhered to the recording medium 2 is further flattened. Hence, a printed matter in which the gloss is further improved can be formed.

4. Examples and Comparative Examples

Hereinafter, with reference to Examples and Comparative Examples, the advantages of the present disclosure will be described in detail. In addition, the present disclosure is not limited to the following Examples.

4.1. Preparation of Clear Ink and Color Ink

Tables 1 and 2 show the compositions of each clear ink and each color ink, the type and the compound name of each polymerizable compound to be used, the presence of the monomer A and the monomer B, the glass transition temperature (Tg) of a homopolymer of each polymerizable compound, the parameters defined by the Van der Waals radii, and the content of each polymerizable compound. In addition, in the column of the composition shown in each of Tables 1 and 2, the numerical unit indicates percent by mass, and the column with no numerical value, that is, with symbol -, indicates that no material is contained. In addition, as the names of the components shown in Tables 1 and 2, abbreviated names are used. The abbreviated names will be described later.

In accordance with the composition of each of a clear ink 1 to a clear ink 16 shown in Tables 1 and 2, the polymerizable compounds, photopolymerization initiators, a polymerization inhibitor, and a slip agent were weighed and charged in a stainless steel-made mixture tank. Subsequently, by using a mechanical stirrer, stirring was performed in an environment at approximately 20° C. for 1 hour, so that solid components, such as the photopolymerization initiators, are thoroughly dissolved in the polymerizable compounds. Next, filtration was performed using a membrane filter having a pore size of 5 μm, so that the clear ink 1 to the clear ink 16 were prepared.

In accordance with the composition of each of a color ink 1 and a color ink 2 shown in Table 2, a pigment functioning as a colorant, a dispersant, and the polymerizable compounds were partially weighed and charged in a bead mill dispersion tank. Subsequently, after ceramic-made beads having a diameter of 1 mm were charged in the above tank, a dispersion treatment was performed by a bead mill, so that a pigment dispersion liquid in which the pigment was dispersed in the polymerizable compounds was formed.

Besides the above pigment dispersion liquid, the remaining polymerizable compounds, photopolymerization initiators, polymerization inhibitor, and slip agent other than those used for the above pigment dispersion liquid were weighed and charged in a stainless steel-made mixture tank. Subsequently, stirring was performed by using a mechanical stirrer, so that solid components, such as the photopolymerization initiators, were thoroughly dissolved in the polymerizable compounds. Next, the above pigment dispersion liquid was weighed and charged in the above mixture tank, and stirring was further performed in an environment at approximately 20° C. for 1 hour. Subsequently, filtration was performed using a membrane filter having a pore size of 5 μm, so that the color ink 1 and the color ink 2 were respectively prepared.

TABLE 1

| | | | MONOMER A | MONOMER B | HOMOPOLYMER Tg [° C.] | PARAMETER DEFINED BY VAN DER WALLS RADII | | | CLEAR INK 1 |
| | | | | | | VOLUME [nm$^3$] | LONG SIDE LENGTH [nm] | HEIGHT DIRECTION AREA [nm$^2$] | |
|---|---|---|---|---|---|---|---|---|---|
| POLYMERIZABLE COMPOUND | MONOFUNCTIONAL MONOMER | 4HBA | YES | | −32 | 0.19 | 0.700 | 0.27 | 10.0 |
| | | DA-141 | YES | YES | 17 | 0.29 | 0.904 | 0.32 | — |
| | | HPA | YES | | −7 | 0.17 | 0.732 | 0.23 | — |
| | | IBXA | | YES | 94 | 0.28 | 0.801 | 0.35 | 24.0 |
| | | DCPA | | YES | 110 | 0.26 | 0.901 | 0.29 | 39.3 |
| | | TBCHA | | YES | 10 | 0.29 | 1.019 | 0.28 | — |
| | | PEA | | | −22 | 0.24 | 1.101 | 0.22 | 5.0 |
| | | ACMO | | | 145 | 0.18 | 0.589 | 0.30 | 10.0 |
| | MULTIFUNCTIONAL MONOMER | DPGDA | | YES | 104 | 0.31 | 0.816 | 0.38 | 3.0 |
| PHOTOPOLYMERIZATION INITIATOR | | | | | IRGACURE 819 | | | | 2.5 |
| | | | | | IRGACURE TPO | | | | 5.5 |
| POLYMERIZATION INHIBITOR | | | | | MEHQ | | | | 0.2 |
| SLIP AGENT | | | | | BYK-UV3500 | | | | 0.5 |
| PIGMENT | | | | | PB15:3 | | | | — |
| DISPERSANT | | | | | Solsperse36000 | | | | — |
| | | | | TOTAL | | | | | 100.0 |

TABLE 1-continued

| CONTENT (PERCENT BY MASS) | TOTAL CONTENT OF MONOMER A AND MONOMER B TO TOTAL MASS OF POLYMERIZABLE COMPOUNDS | 84 |
|---|---|---|
| | CONTENT OF MONOMER A TO TOTAL MASS OF POLYMERIZABLE COMPOUNDS | 11 |
| | CONTENT OF MONOMER B TO TOTAL MASS OF POLYMERIZABLE COMPOUNDS | 73 |
| | CONTENT OF MONOFUNCTIONAL MONOMER TO TOTAL MASS OF POLYMERIZABLE COMPOUNDS | 97 |
| WEIGHTED AVERAGE OF Tgs OF HOMOPOLYMERS OF POLYMERIZABLE COMPOUNDS, OBTAINED WHEN MASS RATIO OF CONTENTS OF POLYMERIZABLE COMPOUNDS IS REGARDED AS WEIGHT BASIS [° C.] | | 87 |

| | | | CLEAR INK | | | | | | | |
|---|---|---|---|---|---|---|---|---|---|---|
| | | | 2 | 3 | 4 | 5 | 6 | 7 | 8 | 9 |
| POLY-MERIZABLE COMPOUND | MONO-FUNCTIONAL MONOMER | 4HBA | 5.0 | 15.0 | 3.0 | — | 10.0 | 10.0 | 10.0 | 10.0 |
| | | DA-141 | — | — | — | — | — | — | — | — |
| | | HPA | — | — | — | — | — | — | — | — |
| | | IBXA | 24.0 | 24.0 | 24.0 | 24.0 | 20.0 | 24.0 | 24.0 | 24.0 |
| | | DCPA | 44.3 | 34.3 | 46.3 | 49.3 | 9.3 | 24.3 | 37.3 | 44.3 |
| | | TBCHA | — | — | — | — | 34.0 | 15.0 | — | — |
| | | PEA | 5.0 | 5.0 | 5.0 | 5.0 | 5.0 | 5.0 | 7.0 | 5.0 |
| | | ACMO | 10.0 | 10.0 | 10.0 | 10.0 | 10.0 | 10.0 | 10.0 | 5.0 |
| | MULTI-FUNCTIONAL MONOMER | DPGDA | 3.0 | 3.0 | 3.0 | 3.0 | 3.0 | 3.0 | 3.0 | 3.0 |
| PHOTOPOLYMERIZATION INITIATOR | | IRGACURE 819 | 2.5 | 2.5 | 2.5 | 2.5 | 2.5 | 2.5 | 2.5 | 2.5 |
| | | IRGACURE TPO | 5.5 | 5.5 | 5.5 | 5.5 | 5.5 | 5.5 | 5.5 | 5.5 |
| POLYMERIZATION INHIBITOR | | MEHQ | 0.2 | 0.2 | 0.2 | 0.2 | 0.2 | 0.2 | 0.2 | 0.2 |
| SLIP AGENT | | BYK-UV3500 | 0.5 | 0.5 | 0.5 | 0.5 | 0.5 | 0.5 | 0.5 | 0.5 |
| PIGMENT | | PB15:3 | — | — | — | — | — | — | — | — |
| DISPERSANT | | Solsperse36000 | — | — | — | — | — | — | — | — |
| | TOTAL | | 100.0 | 100.0 | 100.0 | 100.0 | 100.0 | 100.0 | 100.0 | 100.0 |
| CONTENT (PERCENT BY MASS) | TOTAL CONTENT OF MONOMER A AND MONOMER B TO TOTAL MASS OF POLYMERIZABLE COMPOUNDS | | 84 | 84 | 84 | 84 | 84 | 84 | 81 | 89 |
| | CONTENT OF MONOMER A TO TOTAL MASS OF POLYMERIZABLE COMPOUNDS | | 6 | 17 | 3 | 0 | 11 | 11 | 11 | 11 |
| | CONTENT OF MONOMER B TO TOTAL MASS OF POLYMERIZABLE COMPOUNDS | | 78 | 67 | 80 | 84 | 73 | 73 | 70 | 78 |
| | CONTENT OF MONOFUNCTIONAL MONOMER TO TOTAL MASS OF POLYMERIZABLE COMPOUNDS | | 97 | 97 | 97 | 97 | 97 | 97 | 97 | 97 |
| WEIGHTED AVERAGE OF Tgs OF HOMOPOLYMERS OF POLYMERIZABLE COMPOUNDS, OBTAINED WHEN MASS RATIO OF CONTENTS OF POLYMERIZABLE COMPOUNDS IS REGARDED AS WEIGHT BASIS [° C.] | | | 94 | 79 | 98 | 102 | 50 | 70 | 84 | 85 |

TABLE 2

| | | | MONOMER A | MONOMER B | HOMO-POLYMER Tg [° C.] | PARAMETER DEFINED BY VAN DER WALLS RADII | | | CLEAR INK 10 |
|---|---|---|---|---|---|---|---|---|---|
| | | | | | | VOLUME [nm$^3$] | LONG SIDE LENGTH [nm] | HEIGHT DIRECTION AREA [nm$^2$] | |
| POLY-MERIZABLE COMPOUND | MONO-FUNCTIONAL MONOMER | 4HBA | YES | | −32 | 0.19 | 0.700 | 0.27 | 10.0 |
| | | DA-141 | YES | YES | 17 | 0.29 | 0.904 | 0.32 | — |
| | | HPA | YES | | −7 | 0.17 | 0.732 | 0.23 | — |
| | | IBXA | | YES | 94 | 0.28 | 0.801 | 0.35 | 24.0 |
| | | DCPA | | YES | 110 | 0.26 | 0.901 | 0.29 | 30.3 |
| | | TBCHA | | YES | 10 | 0.29 | 1.019 | 0.28 | — |

TABLE 2-continued

|  |  | PEA |  | −22 | 0.24 | 1.101 | 0.22 | 5.0 |
|---|---|---|---|---|---|---|---|---|
|  |  | ACMO |  | 145 | 0.18 | 0.589 | 0.30 | 10.0 |
|  | MULTI-FUNCTIONAL MONOMER | DPGDA | YES | 104 | 0.31 | 0.816 | 0.38 | 12.0 |
| PHOTOPOLYMERIZATION INITIATOR |  |  | IRGACURE 819 |  |  |  |  | 2.5 |
|  |  |  | IRGACURE TPO |  |  |  |  | 5.5 |
| POLYMERIZATION INHIBITOR |  |  | MEHQ |  |  |  |  | 0.2 |
| SLIP AGENT |  |  | BYK-UV3500 |  |  |  |  | 0.5 |
| PIGMENT |  |  | PB15:3 |  |  |  |  | — |
| DISPERSANT |  |  | Solsperse36000 |  |  |  |  | — |
|  |  | TOTAL |  |  |  |  |  | 100.0 |
| CONTENT (PERCENT BY MASS) | TOTAL CONTENT OF MONOMER A AND MONOMER B TO TOTAL MASS OF POLYMERIZABLE COMPOUNDS |  |  |  |  |  |  | 84 |
|  | CONTENT OF MONOMER A TO TOTAL MASS OF POLYMERIZABLE COMPOUNDS |  |  |  |  |  |  | 13 |
|  | CONTENT OF MONOMER B TO TOTAL MASS OF POLYMERIZABLE COMPOUNDS |  |  |  |  |  |  | 73 |
|  | CONTENT OF MONOFUNCTIONAL MONOMER TO TOTAL MASS OF POLYMERIZABLE COMPOUNDS |  |  |  |  |  |  | 87 |
| WEIGHTED AVERAGE OF Tgs OF HOMOPOLYMERS OF POLYMERIZABLE COMPOUNDS, OBTAINED WHEN MASS RATIO OF CONTENTS OF POLYMERIZABLE COMPOUNDS IS REGARDED AS WEIGHT BASIS [° C.] |  |  |  |  |  |  |  | 86 |

|  |  |  | CLEAR INK | | | | | | COLOR INK | |
|---|---|---|---|---|---|---|---|---|---|---|
|  |  |  | 11 | 12 | 13 | 14 | 15 | 16 | 1 | 2 |
| POLY-MERIZABLE COMPOUND | MONO-FUNCTIONAL MONOMER | 4HBA | 10.0 | 10.0 | 10.0 | — | — | 10.0 | 10.0 | 10.0 |
|  |  | DA-141 | — | — | — | 10.0 | — | — | — | — |
|  |  | HPA | — | — | — | — | 10.0 | — | — | — |
|  |  | IBXA | 24.0 | 24.0 | 24.0 | 24.0 | 24.0 | 14.0 | 24.0 | 24.0 |
|  |  | DCPA | 24.3 | 31.0 | 35.0 | 39.3 | 39.3 | 9.3 | 37.1 | 22.1 |
|  |  | TBCHA | — | — | — | — | — | 40.0 | — | — |
|  |  | PEA | 5.0 | 13.3 | 9.3 | 5.0 | 5.0 | 5.0 | 5.0 | 5.0 |
|  |  | ACMO | 10.0 | 10.0 | 10.0 | 10.0 | 10.0 | 10.0 | 10.0 | 10.0 |
|  | MULTI-FUNCTIONAL MONOMER | DPGDA | 18.0 | 3.0 | 3.0 | 3.0 | 3.0 | 3.0 | 3.0 | 18.0 |
| PHOTOPOLYMERIZATION INITIATOR | IRGACURE 819 |  | 2.5 | 2.5 | 2.5 | 2.5 | 2.5 | 2.5 | 2.5 | 2.5 |
|  | IRGACURE TPO |  | 5.5 | 5.5 | 5.5 | 5.5 | 5.5 | 5.5 | 5.5 | 5.5 |
| POLYMERIZATION INHIBITOR | MEHQ |  | 0.2 | 0.2 | 0.2 | 0.2 | 0.2 | 0.2 | 0.2 | 0.2 |
| SLIP AGENT | BYK-UV3500 |  | 0.5 | 0.5 | 0.5 | 0.5 | 0.5 | 0.5 | 0.5 | 0.5 |
| PIGMENT | PB15:3 |  | — | — | — | — | — | — | 2.0 | 2.0 |
| DISPERSANT | Solsperse36000 |  | — | — | — | — | — | — | 0.2 | 0.2 |
|  | TOTAL |  | 100.0 | 100.0 | 100.0 | 100.0 | 100.0 | 100.0 | 100.0 | 100.0 |
| CONTENT (PERCENT BY MASS) | TOTAL CONTENT OF MONOMER A AND MONOMER B TO TOTAL MASS OF POLYMERIZABLE COMPOUNDS |  | 84 | 74 | 79 | 84 | 84 | 84 | 83 | 83 |
|  | CONTENT OF MONOMER A TO TOTAL MASS OF POLYMERIZABLE COMPOUNDS |  | 14 | 11 | 11 | 11 | 11 | 11 | 12 | 14 |
|  | CONTENT OF MONOMER B TO TOTAL MASS OF POLYMERIZABLE COMPOUNDS |  | 73 | 64 | 68 | 84 | 73 | 73 | 72 | 72 |
|  | CONTENT OF MONOFUNCTIONAL MONOMER TO TOTAL MASS OF POLYMERIZABLE COMPOUNDS |  | 80 | 97 | 97 | 97 | 97 | 97 | 97 | 80 |
| WEIGHTED AVERAGE OF Tgs OF HOMOPOLYMERS OF POLYMERIZABLE COMPOUNDS, OBTAINED WHEN MASS RATIO OF CONTENTS OF POLYMERIZABLE COMPOUNDS IS REGARDED AS WEIGHT BASIS [° C.] |  |  | 86 | 75 | 80 | 92 | 89 | 45 | 86 | 85 |

Details of the abbreviated names shown in Tables 1 and 2 are as follows.

Monofunctional Monomer
- 4HBA: 4-hydroxybutyl acrylate, Osaka Organic Chemical Industry Ltd.
- DA-141: 2-hydroxy-3-phenoxypropyl acrylate, Nagase ChemteX Corp.
- HPA: hydroxypropyl acrylate, Osaka Organic Chemical Industry Ltd.
- IBXA: isobornyl acrylate, Osaka Organic Chemical Industry Ltd.
- DCPA: dicyclopentenyl acrylate, Hitachi chemical Company, Ltd.
- TBCHA: tert-butylcyclohexanol acrylate, trade name: SR217, Sartomer Inc.
- PEA: phenoxyethyl acrylate, trade name: Viscoat #192, Osaka Organic Chemical Industry Ltd.
- ACMO: Acryloyl morpholine, KJ Chemicals Corp.

In addition, among the monofunctional monomers mentioned above, monomers corresponding to the monomer A are 4HBA and HPA, monomers corresponding to the monomer B are IBXA, DCPA, and TBCHA, and a monomer corresponding to both the monomer A and the monomer B is DA-141.

Multifunctional Monomer
- DPGDA: dipropylene glycol diacrylate, Sartomer Inc.
- DPGDA corresponds to the monomer B.

Photopolymerization Initiator
- IRGACURE 819: trade name, bis(2,4,6-trimethylbenzoyl)-phenylphosphine oxide, BASF
- IRGACURE TPO: trade name, 2,4,6-trimethylbenzoyldiphenylphosphine oxide, BASF POLYMERIZATION INHIBITOR
- MEHQ: 4-methoxyphenol, Kanto Chemical Co., Inc.

SLIP AGENT
- BYK-UV3500: polyether-modified polydimethylsiloxane having an acryloyl group, BYK Additives & Instruments PIGMENT PB 15: 3, C.I. Pigment Blue 15: 3 DISPERSANT
Solsperse36000: trade name, polymer dispersant, Lubrizol In addition, in Tables 1 and 2, among the parameters defined by the Van der Waals radii, the numerical value of the volume indicates the volume of a cavity of a molecule calculated using COSMOtherm which is software of MOLSIS Inc., the cavity of the molecule being a cavity formed using the Van der Waals radii of atoms forming the molecule which is assumed to be floating in vacuum. Among the parameters described above, the numerical value of the length of the long side indicates the longest side of the cavity which is used for the calculation of the volume. Among the parameters described above, the height direction area is the numerical value obtained by dividing the above volume by the length of the long side.

4.2. Ink Set

In Table 3, the content of the ink set of each of Examples 1 to 14 and Comparative Examples 1 to 5 and evaluations results of each ink set are shown. In addition, hereinafter, Examples 1 to 14 may be simply collectively called Examples in some cases, and Comparative Examples 1 to 5 may also be simply called Comparative Examples in some cases.

Incidentally, the ink set of Comparative Example 1 used the clear ink 5. In the clear ink 5, the content of the monomer A with respect to the total mass of the polymerizable compounds was 0 percent by mass, that is, less than 5 percent by mass.

The ink sets of Comparative Examples 2 and 4 each used the clear ink 12. In the clear ink 12, the content of the monomer A and the monomer B with respect to the total mass of the polymerizable compounds was 74 percent by mass, that is, less than 80 percent by mass.

The ink sets of Comparative Examples 3 and 5 each used the clear ink 13. In the clear ink 13, the content of the monomer A and the monomer B with respect to the total mass of the polymerizable compounds was 79 percent by mass, that is, less than 80 percent by mass.

TABLE 3

| | | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| INK SET | CLEAR INK | 1 | 2 | 3 | 4 | 6 | 7 | 8 |
| | COLOR INK | 1 | 1 | 1 | 1 | 1 | 1 | 1 |
| EVALUATION RESULT OF CLEAR INK | VISCOSITY OF INK | A | A | C | AA | AA | A | A |
| | ODOR OF COATING FILM | A | A | A | B | A | A | A |
| | GLOSS OF COATING FILM | A | A | A | A | A | A | B |
| | STRETCHING PROPERTY OF COATING FILM | A | A | A | A | A | A | A |
| | ABRASION RESISTANCE OF COATING FILM | A | A | A | A | B | B | A |

TABLE 3-continued

|  |  | EXAMPLE 8 | EXAMPLE 9 | EXAMPLE 10 | EXAMPLE 11 | EXAMPLE 12 | EXAMPLE 13 | EXAMPLE 14 |
|---|---|---|---|---|---|---|---|---|
| INK SET | CLEAR INK | 9 | 10 | 11 | 14 | 15 | 16 | 7 |
|  | COLOR INK | 1 | 1 | 1 | 1 | 1 | 1 | 2 |
| EVALUATION RESULT OF CLEAR INK | VISCOSITY OF INK | A | A | B | A | A | A | A |
|  | ODOR OF COATING FILM | A | A | A | A | A | A | A |
|  | GLOSS OF COATING FILM | A | A | A | A | A | A | A |
|  | STRETCHING PROPERTY OF COATING FILM | A | B | C | A | A | A | A |
|  | ABRASION RESISTANCE OF COATING FILM | A | A | A | A | A | C | A |

|  |  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|
| INK SET | CLEAR INK | 5 | 12 | 13 | 12 | 13 |
|  | COLOR INK | 1 | 1 | 1 | 2 | 2 |
| EVALUATION RESULT OF CLEAR INK | VISCOSITY OF INK | A | A | A | A | A |
|  | ODOR OF COATING FILM | C | A | A | A | A |
|  | GLOSS OF COATING FILM | A | D | D | C | C |
|  | STRETCHING PROPERTY OF COATING FILM | A | A | A | A | A |
|  | ABRASION RESISTANCE OF COATING FILM | A | B | A | B | A |

4.3. Evaluations

By using the ink set of each of Examples and Comparative Examples, the following evaluations were performed, and the results thereof are shown in Table 3.

4.3.1. Viscosity of Clear Ink

By the measurement method of the viscosity at 20° C. described above, the viscosity of the clear ink at 20° C. was measured and then evaluated in accordance with the following evaluation criteria.

Evaluation Criteria

AA: 22 to 24 mPa·s
A: more than 24 to 26 mPa·s
B: more than 26 to 28 mPa·s
C: more than 28 mPa·s 4.3.2. Odor of Coating Film of Clear Ink By using a bar coater, the clear ink corresponding to the ink set was applied on a recording medium to have a thickness of 10 μm. For the recording medium, as a PVC film, JT5829 which was a trade name of MACtac was used. Subsequently, by using an UV-LED, radiation rays having an energy of 400 mJ/cm² were emitted, so that a coating film of the clear ink was formed. A sensory evaluation was performed on an odor generated from the coating film of the clear ink in an environment at approximately 25° C. and then evaluated in accordance with the following evaluation criteria.

Evaluation Criteria

A: One of no odor, an odor which is barely sensed, and an odor which is weak but is to be discriminated.
B: An odor which is easily sensed.
C: a strong or an intensive odor.

4.3.3. Gloss of Coating Film of Clear Ink

By using a bar coater, the color ink was applied on a recording medium to have a thickness of 10 μm. For the recording medium, Iupilon (registered trademark) NF2000 manufactured by Mitsubishi Gas Chemical Company, Inc., which was a polycarbonate, was used. Subsequently, by using an UV-LED, radiation rays having an energy of 400 mJ/cm² were emitted, so that a coating film of the color ink was formed. Next, on the coating film of the color ink, the clear ink was applied by a bar coater to have a thickness of 10 μm. In addition, after the clear ink was applied, the recording medium thus processed was allowed to stand still for one minute as a leveling step. Subsequently, by using the above UV-LED, radiation rays having an energy of 400 mJ/cm² was emitted, so that a coating film of the clear ink was formed. When this coating film of the clear ink was observed by eye inspection using a fluorescent lamp, the distance between the coating film of the clear ink and an eye which could recognize the reflection of the fluorescent lamp was measured. The gloss was evaluated using the distance described above in accordance with the following evaluation criteria.

Evaluation Criteria

A: Reflection of the fluorescent lamp is recognized even at a distance of 50 cm or more.
B: Reflection of the fluorescent lamp is recognized at a distance of 30 cm to less than 50 cm.

C: Reflection of the fluorescent lamp is recognized at a distance of 10 cm to less than 30 cm.

D: Reflection of the fluorescent lamp is recognized at a distance of less than 10 cm, or reflection thereof is not recognized.

4.3.4. Stretching Property of Coating Film of Clear Ink

By using a bar coater, the clear ink corresponding to the ink set was applied on a recording medium to have a thickness of 10 μm. For the recording medium, as a PVC film, JT5829 which was a trade name of MACtac was used. Subsequently, by using a metal halide lamp manufactured by Eye Graphics Co., Ltd., radiation rays having an energy of 400 mJ/cm$^2$ were emitted, so that a coating film of the clear ink was formed.

Next, after release paper of the above PVC film was peeled away from the coating film of the clear ink, the coating film of the clear ink was cut together with the PVC film to form a rectangular test piece having a width of 1 cm and a length of 8 cm. By using a TENSILON (registered trademark) manufactured by ORIENTEC, an elongation rate of the test piece used as an index of the stretching property was measured in an environment at approximately 25° C. The test piece was elongated at a rate of 5 mm/min, and when the coating film of the clear ink was cracked, the value thereof was used as the elongation rate. In particular, from an interchuck distance of the tensile tester to which the test piece was set, the elongation rate was calculated by the following equation. The stretching property was evaluated in accordance with the following evaluation criteria.

Elongation rate={(interchuck distance at crack generation-initial interchuck distance before elongation)/initial interchuck distance before elongation}×100

Evaluation Criteria

A: elongation rate of 300% or more

B: elongation rate of 200% to less than 300%

C: elongation rate of less than 200%

4.3.5. Abrasion Resistance of Coating Film of Clear Ink and Color Ink

By using a bar coater, the color ink was applied on a recording medium to have a thickness of 10 μm. For the recording medium, as a PVC film, JT5829 which was a trade name of MACtac was used. Subsequently, by using a metal halide lamp manufactured by Eye Graphics Co., Ltd., radiation rays having an energy of 400 mJ/cm$^2$ were emitted, so that a coating film of the color ink was formed. Subsequently, the clear ink was applied on the coating film of the color ink to have a thickness of 10 μm. Next, by using the above metal halide lamp, radiation rays having an energy of 400 mJ/cm$^2$ were emitted, so that a coating film of the clear ink was formed.

As an index of the abrasion resistance, a microscratch test of JIS R3255 was performed on the coating films of the color ink and the clear ink. In particular, by using an ultra thin-film scratch tester CSR-5000 manufactured by Nanotec Corp., the coating film was scratched while a load to be applied to a probe was changed, and when the probe penetrated the coating film and reached the PVC film functioning as the recording medium, the load at this point was measured. In addition, when the probe reached the PVC film, the load applied to the probe was also called a withstand load. As the measurement conditions, a probe stylus diameter, an amplitude, and a scratching rate were set to 15 μm, 100 μm, and 10 μm/sec, respectively. By the withstand load thus measured, the abrasion resistance was evaluated in accordance with the following evaluation criteria. Incidentally, as the withstand load is increased, the abrasion resistance is superior.

Evaluation Criteria

A: Withstand load of 25 mN/cm$^2$ or more

B: Withstand load of 20 mN/cm$^2$ to less than 25 mN/cm$^2$

C: Withstand load of less than 20 mN/cm$^2$ 4.4. Conclusion of Evaluation Results As shown in Table 3, in Examples other than Examples 4 and 7, the odor and the gloss of the coating film of the clear ink were each evaluated as A corresponding to "excellent". In addition, in Example 4, the odor of the coating film was evaluated as B corresponding to "good", and the gloss of the coating film was evaluated as A. In Example 7, the odor of the coating film was evaluated as A, and the gloss of the coating film was evaluated as B corresponding to "good". Accordingly, the ink set of each Example showed that the gloss of the coating film of the clear ink was not only improved but the generation of the odor from the coating films was also suppressed.

In addition, in Examples other than Examples 3 and 10, the viscosity of the clear ink was evaluated as A corresponding to "excellent" or more. In Examples other than Examples 9 and 10, the stretching property of the coating film of the clear ink was evaluated as A corresponding to "excellent". In Examples other than Example 13, the abrasion resistance of the coating film of the clear ink was evaluated as B corresponding to "good" or more, and in particular, in Examples other than Examples 5 and 6, the abrasion resistance was evaluated as A corresponding to "excellent". Accordingly, in the ink set of each Example, it was shown that the viscosity of the clear ink and the stretching property and the abrasion resistance of the coating film tend to be improved.

On the other hand, in Comparative Examples 2 to 5, the gloss of the coating film of the clear ink was evaluated as C corresponding to "no good (NG)" or less. In addition, in Comparative Example 1, the odor of the coating film of the clear ink was evaluated as C corresponding to "NG". That is, in the ink set of each Comparative Example, it was found that the odor and the gloss of the coating film of the clear ink were both difficult to simultaneously improve. In particular, in Comparative Examples 2 and 3 in each of which the color ink 1 was used, compared to Comparative Examples 4 and 5 in each of which the color ink 2 was used, the gloss was inferior. On the other hand, in the ink set of each Example, even in the ink set using the color ink 1, the gloss was evaluated as B or more. That is, it was shown that the clear ink of each Example was preferable for the color ink 1.

Hereinafter, the contents derived from the embodiments will be described.

The ink set is an ink set of radiation curable ink jet inks each containing polymerizable compounds and includes a color ink and a clear ink; the polymerizable compounds contained in the clear ink include a monomer A having a hydroxy group and a monomer B having a volume of 0.26 nm$^3$ or more and a height direction area of 0.25 nm$^2$ or more with respect to a long side each of which is defined by the Van der Waals radii; and a total content of the monomer A and the monomer B is 80 percent by mass or more with respect to a total mass of the polymerizable compounds contained in the clear ink.

According to the structure described above, in the clear ink, the gloss of the coating film is improved, and in addition, the generation of the odor from the coating film can also be suppressed. In particular, the monomer B has a bulky molecular structure. Since the monomer B is used, the gloss of the coating film formed from the clear ink can be improved. Since the monomer A has a hydroxy group in its molecular structure, compared to a polymerizable compound having a bulky molecular structure, the odor of the coating film is difficult to generate. Hence, since the monomer A is used together with the monomer B, the odor generated from the coating film can be suppressed. In addition, the monomer A has a minor effect on the gloss of the coating film and does not degrade the gloss of the coating film.

Furthermore, since the content of the monomer A and the monomer B is 80 percent by mass or more, when a polymerizable compound, such as PEA, other than the monomer A and the monomer B is contained, the content of the polymerizable compound other than the monomer A and the monomer B is inevitably decreased. Accordingly, an ink set in which in the clear ink, the gloss of the coating film is not only improved but also the generation of the odor from the coating film is suppressed can be provided.

In the ink set described above, the content of the monomer A with respect to the total mass of the polymerizable compounds contained in the clear ink is preferably 5 to 15 percent by mass.

According to the structure described above, since the content of the monomer A is 5 percent by mass or more, the odor generated from the coating film can be further suppressed. In addition, since the content of the monomer A is 15 percent by mass or less, an excessive increase in viscosity of the clear ink can be suppressed.

In the ink set described above, the content of the monomer B with respect to the total mass of the polymerizable compounds contained in the clear ink is preferably 70 percent by mass or more.

According to this structure, the gloss of the coating film formed from the clear ink can be further improved.

In the ink set described above, the polymerizable compounds contained in the clear ink preferably include a monofunctional monomer, and the content of the monofunctional monomer with respect to the total mass of the polymerizable compounds contained in the clear ink is preferably 85 percent by mass or more.

According to this structure, the stretching property of the coating film formed from the clear ink is improved. Hence, even when the coating film described above is formed on a flexible sheet for signage application or the like, the breakage and/or the peeling is not likely to occur. That is, an ink set preferably used for signage application can be provided.

In the ink set described above, the polymerizable compounds contained in the clear ink preferably include a multifunctional monomer, and the content of the multifunctional monomer with respect to the total mass of the clear ink is preferably 0.01 to 15.00 percent by mass.

According to this structure, a cross-linked structure is formed in the coating film by the multifunctional monomer. Hence, compared to the case in which the multifunctional monomer is not used, the curing property of the clear ink and the abrasion resistance of the coating film thereof can be improved. In addition, since the content of the multifunctional monomer is 15.00 percent by mass or less, the stretching property of the coating film can be secured.

In the ink set described above, the mass ratio of the contents of the polymerizable compounds contained in the clear ink is regarded as a weight basis, and the weighted average of glass transition temperatures of homopolymers of the respective polymerizable compounds is preferably 48° C. or more.

According to this structure, the abrasion resistance of the coating film formed from the clear ink can be improved.

In the ink set described above, the polymerizable compounds contained in the color ink preferably include a monofunctional monomer, and the content of the monofunctional monomer with respect to the total mass of the polymerizable compounds contained in the color ink is preferably 85 percent by mass or more.

According to the structure described above, the clear ink described above may be preferably used for the color ink. In particular, when the coating film of the clear ink is formed on the coating film of the color ink, if a large amount of the monofunctional monomer is contained in the color ink, heretofore, the gloss of the coating film of the clear ink is liable to be degraded. On the other hand, according to the clear ink of the present disclosure, the gloss of the coating film of the clear ink can be improved.

An ink jet method is an ink jet method using the ink set described above and includes a first ejection step of ejecting the color ink from an ink jet head to be adhered to a recording medium; a first curing step of emitting radiation rays on the color ink adhered to the recording medium; a second ejection step of ejecting the clear ink from an ink jet head to be adhered to a region of the recording medium including the color ink irradiated with the radiation rays; and a second curing step of emitting radiation rays on the clear ink adhered to the recording medium.

According to the structure described above, the coating film of the clear ink is formed on the coating film of the color ink. Hence, the coating film of the clear ink protects the coating film of the color ink and also improves the gloss. Accordingly, a printed matter in which the abrasion resistance and the gloss of the color ink are improved can be formed.

The ink jet method described above preferably further includes, between the second ejection step and the second curing step, a leveling step of allowing the recording medium to which the clear ink is adhered to stand still.

According to the structure described above, the liquid layer of the clear ink adhered to the recording medium is further flattened in the leveling step. Hence, a printed matter in which the gloss is further improved can be formed.

What is claimed is:

1. An ink set of radiation curable ink jet inks each of which contains polymerizable compounds, the ink set comprising:
   a color ink and a clear ink,
   wherein the polymerizable compounds contained in the clear ink include a monomer A having a hydroxy group and a monomer B having a volume of 0.26 nm$^3$ or more and a height direction area of 0.25 nm$^2$ or more with respect to a long side each of which is defined by the Van der Waals radii,
   a total content of the monomer A and the monomer B is 80 percent by mass or more with respect to a total mass of the polymerizable compounds contained in the clear ink, and
   wherein a content of the monomer A is 5 to 15 percent by mass with respect to the total mass of the polymerizable compounds contained in the clear ink.

2. The ink set according to claim 1,
   wherein a content of the monomer B is 70 percent by mass or more with respect to the total mass of the polymerizable compounds contained in the clear ink.

3. The ink set according to claim 1,
   wherein the polymerizable compounds contained in the clear ink include a monofunctional monomer, and a content of the monofunctional monomer is 85 percent by mass or more with respect to the total mass of the polymerizable compounds contained in the clear ink.

4. The ink set according to claim 1,
wherein the polymerizable compounds contained in the clear ink include a multifunctional monomer, and
a content of the multifunctional monomer is 0.01 to 15.00 percent by mass with respect to a total mass of the clear ink.

5. The ink set according to claim 1,
wherein a mass ratio of the contents of the polymerizable compounds contained in the clear ink is regarded as a weight basis, and
a weighted average of glass transition temperatures of homopolymers of the respective polymerizable compounds is 48° C. or more.

6. The ink set according to claim 1,
wherein the polymerizable compounds contained in the color ink include a monofunctional monomer, and
a content of the monofunctional monomer is 85 percent by mass or more with respect to a total mass of the polymerizable compounds contained in the color ink.

7. An ink jet method using the ink set according to claim 1, the method comprising:
a first ejection step of ejecting the color ink from an ink jet head to be adhered to a recording medium;
a first curing step of emitting radiation rays on the color ink adhered to the recording medium;
a second ejection step of ejecting the clear ink from an ink jet head to be adhered to a region of the recording medium including the color ink irradiated with the radiation rays; and
a second curing step of emitting radiation rays on the clear ink adhered to the recording medium.

8. The ink jet method according to claim 7,
further comprising, between the second ejection step and the second curing step, a leveling step of allowing the recording medium to which the clear ink is adhered to stand still.

\* \* \* \* \*